US008024003B2

(12) United States Patent
Cezanne et al.

(10) Patent No.: US 8,024,003 B2

(45) Date of Patent: Sep. 20, 2011

(54) METHODS AND APPARATUS FOR SUPPORTING COMMUNICATIONS USING ANTENNAS ASSOCIATED WITH DIFFERENT POLARIZATION DIRECTIONS

(75) Inventors: Juergen Cezanne, Ocean Township, NJ (US); Saurabh Tavildar, Jersey City, NJ (US); Vikram Reddy Anreddy, Bridgewater, NJ (US); Xinzhou Wu, Monmouth Junction, NJ (US); Rajiv Laroia, Far Hills, NJ (US)

(73) Assignee: QUALCOMM Incorporated, San Diego, CA (US)

(*) Notice: Subject to any disclaimer, the term of this patent is extended or adjusted under 35 U.S.C. 154(b) by 778 days.

(21) Appl. No.: 12/043,869

(22) Filed: Mar. 6, 2008

(65) Prior Publication Data

US 2009/0224847 A1 Sep. 10, 2009

(51) Int. Cl.
*H04B 7/00* (2006.01)
*H04B 17/02* (2006.01)

(52) U.S. Cl. .................. 455/562.1; 455/137; 455/277.1; 455/273

(58) Field of Classification Search .................. 455/101, 455/562.1, 25, 63.4, 575.7, 279.1, 304, 273, 455/137, 277.1
See application file for complete search history.

(56) References Cited

U.S. PATENT DOCUMENTS

| | | | | |
|---|---|---|---|---|
| 5,036,331 | A | 7/1991 | Dallabetta et al. | |
| 6,044,254 | A * | 3/2000 | Ohta et al. | 455/272 |
| 6,411,824 | B1 | 6/2002 | Eidson | |
| 6,437,750 | B1 | 8/2002 | Grimes et al. | |
| 6,470,193 | B1 * | 10/2002 | Stolt | 455/562.1 |
| 6,486,848 | B1 | 11/2002 | Poilasne et al. | |
| 6,546,236 | B1 * | 4/2003 | Canada et al. | 455/304 |
| 6,963,301 | B2 | 11/2005 | Schantz et al. | |
| 7,038,628 | B1 * | 5/2006 | Rausch | 343/702 |
| 2007/0282482 | A1 | 12/2007 | Beucher et al. | |

FOREIGN PATENT DOCUMENTS

| | | |
|---|---|---|
| DE | 480853 | 8/1929 |
| DE | 10025992 | 1/2002 |
| EP | 1617515 | 1/2006 |
| JP | 2000077934 | 3/2000 |
| JP | 2001332930 | 11/2001 |

OTHER PUBLICATIONS

International Search Report and Written Opinion—PCT/US2009/036424—International Search Authority—European Patent Office, May 25, 2009. Kraus J.D, et al., "Antennas for all applications", Antennas, 2002, p. 726-727, vol. Ed.3, McGraw-Hill, New York—ISBN 978-0-07-112240-5 ; ISBN 0-07-112240-0, XP002529286.

* cited by examiner

*Primary Examiner* — Sonny Trinh

(74) *Attorney, Agent, or Firm* — Francois A. Pelaez; Jonathan T. Velasco

(57) ABSTRACT

A communications device, e.g., a mobile wireless terminal, includes a plurality of antennas having different polarization directions. The plurality of antennas includes a first antenna and second antenna which are operated in a coordinated fashion. During reception a signal received via the first antenna is subjected to a phase shift operation before being combined with a signal received via the second antenna. During transmission a signal to be communicated is subjected to a phase shift operation and the phase shifted signal is transmitted over the first antenna while the non-phase shifted signal is transmitted over the second antenna. The amount of phase shift is a function of the difference in polarization directions between the first and second antennas. The novel antenna configuration facilitates the use of the horizontal polarization direction communications between the communications device and a base station without the need for directionally positioning one or more electrical antennas.

32 Claims, 19 Drawing Sheets

METHODS AND APPARATUS FOR SUPPORTING COMMUNICATIONS USING ANTENNAS ASSOCIATED WITH DIFFERENT POLARIZATION DIRECTIONS

FIELD

Various embodiments relate to wireless communications systems, and more particularly to methods and apparatus of using antennas having different polarizations.

BACKGROUND

A large number of antenna types have been known for quite some time. For example, consider FIGS. 1, 2 and 3 which illustrate various known types of antennas including a dipole antenna 10 shown in FIG. 1, a loop antenna 12 shown in FIG. 2 and a slot antenna 14 shown in FIG. 3.

In Multiple-input and multiple-output (MIMO) systems multiple antennas are normally used at both the transmitter and receiver to improve the performance of radio communications. In a MIMO system vertically and horizontally polarized dipole antennas may be used to receive and/or transmit vertically and horizontally polarized electromagnetic waves, respectively. In theory the use of two dipole antennas, one horizontal and one vertical should allow for successful recovery of vertically and horizontally polarized signals. However, the combination has proven less than ideal under real world conditions encountered by mobile wireless devices.

Some of the problems with the use of dipole antennas can be appreciated from the diagram of FIG. 4 which shows the azimuth directivity pattern 16 for a horizontal dipole antenna such as the antenna 10 shown in FIG. 1. While the directivity pattern of a vertical dipole antenna is omni-directional in the horizontal plane, the corresponding pattern of a horizontal dipole varies considerably with the angle of incidence, as shown in FIG. 4. Note that the horizontal dipole cannot receive or transmit a wave from or in the direction it is pointing to as illustrated by the presence of nulls in the antenna pattern. Given the limitations of the dipole antenna in the horizontal direction, a successful transmission and/or reception operation may require the user and/or some mechanical apparatus, to orient the horizontal dipole in such a way that its broadside points to the direction of the receiver/transmitter device with which communication is to be achieved. It should be appreciated that this approach is not very user friendly and can be relatively expensive when the rotation processes is implemented using a motor or other automated process.

In view of the above discussion, it would be desirable if improved methods and apparatus could be developed to provide antenna diversity in terms of both horizontal and vertical polarized antennas being supported but without the need to rotate or otherwise mechanically reorient a dipole antenna to achieve suitable reception/transmission characteristics relative to the position of another device with which communication is being attempted.

SUMMARY

Methods and apparatus for receiving and transmitting signals using a device including multiple antennas having different polarizations are described.

Various embodiments are directed to a communications device, e.g., a mobile wireless terminal, which includes a plurality of electrical antennas having different polarization directions. The plurality of antennas includes a first antenna and second antenna which are operated in a coordinated fashion. During reception a signal received via the first antenna is subjected to a phase shift operation before being combined with a signal received via the second antenna. During transmission a signal to be communicated is subjected to a phase shift operation and the phase shifted signal is transmitted over the first antenna while the non-phase shifted signal is transmitted concurrently over the second antenna. The amount of phase shift is a function of the difference in polarization directions between the first and second antennas. In some embodiments use of the first and second antennas in combination with the phase shift results in an overall omni-directional pattern for horizontally polarized waves.

Some, but not necessarily all embodiments, include a third electrical antenna having a polarization direction which is different from the polarization directions associated with the first and second antenna. In one embodiment, the communications device includes a first combiner module including a phase shifter module for processing the received signals from the first and second antennas and a second combiner module for processing the received signal from the third antenna and the output signal from the first combiner module. The second combiner module, e.g., a maximal ratio combiner or a minimum mean square error module, is used, in some embodiments, in recovering two data streams being communicated concurrently.

An exemplary communications device, in accordance with some embodiments, comprises: a first electrical antenna, the first electrical antenna having a polarization in a first direction; a second electrical antenna, the second electrical antenna element having a polarization in a second direction; and a first combining module for combining signals from said first and second antennas, said combining module including a phase shifter for shifting the signal from one of said first and second antennas prior to combing them using a summing module to produce a combined signal. In some such embodiments, the communications device further includes a third electrical antenna, the third electrical antenna having a polarization in a third direction, said first second and third directions each being different from one another by more than 45 degrees. In one exemplary embodiment, the angle between the first and second directions is in the range of 80 to 100 degrees. In some embodiments, the phase shifter introduces a phase shift of a predetermined amount, said predetermined amount being a function of the angle between said first and second directions.

An exemplary method of operating a communications device, in accordance with some embodiments comprises: operating a first electrical antenna, the first electrical antenna having a polarization in a first direction to receive signals; operating a second electrical antenna, the second electrical antenna element having a polarization in a second direction to receive signals; and operating a first combining module to combine signals from said first and second antennas, said combining including subjecting a signal received by the first antenna to a phase shifting operation and summing the resulting phase shifted signal with a signal from the second antenna to produce a combined signal.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION OF THE FIGURES

Methods and apparatus of the various embodiments are directed to using a combination of antenna elements to recover signals. In various exemplary embodiments while multiple antennas may be used, a single receiver and/or transmitter chain may be used to allow for relatively low cost device implementations. In other embodiments, multiple receiver and/or transmitter chains may be used in a device. Exemplary communications devices include wireless terminals such as cell phones, PDAs, and other portable devices as well as other devices such as base stations.

Figure 1:
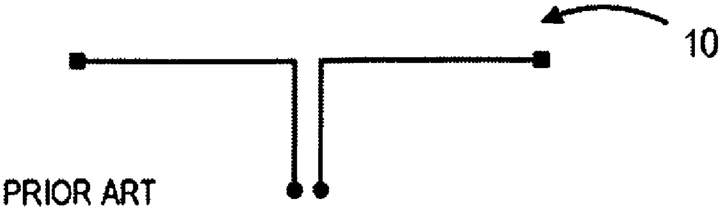
PRIOR ART FIGURE 1
FIG. 1 illustrates a dipole antenna.
Figure 2:
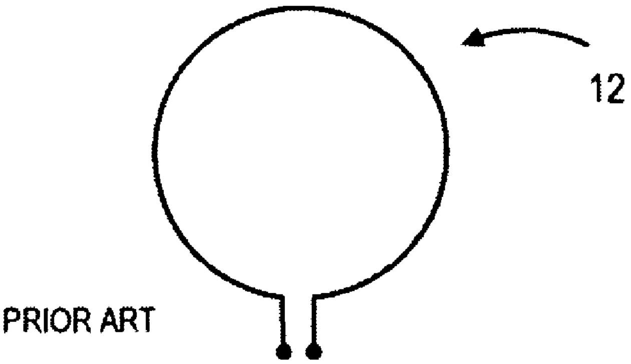
PRIOR ART FIGURE 2
FIG. 2 illustrates a loop antenna.
Figure 3:
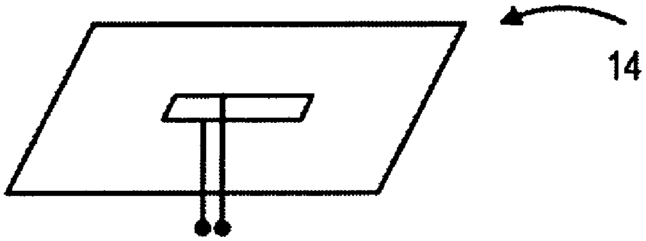
PRIOR ART FIGURE 3
FIG. 3 illustrates a slot antenna.
Figure 4:
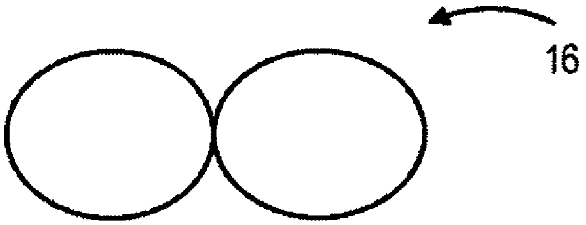
PRIOR ART FIGURE 4
FIG. 4 illustrates an azimuth directivity pattern for a horizontal dipole antenna.
Figure 5:
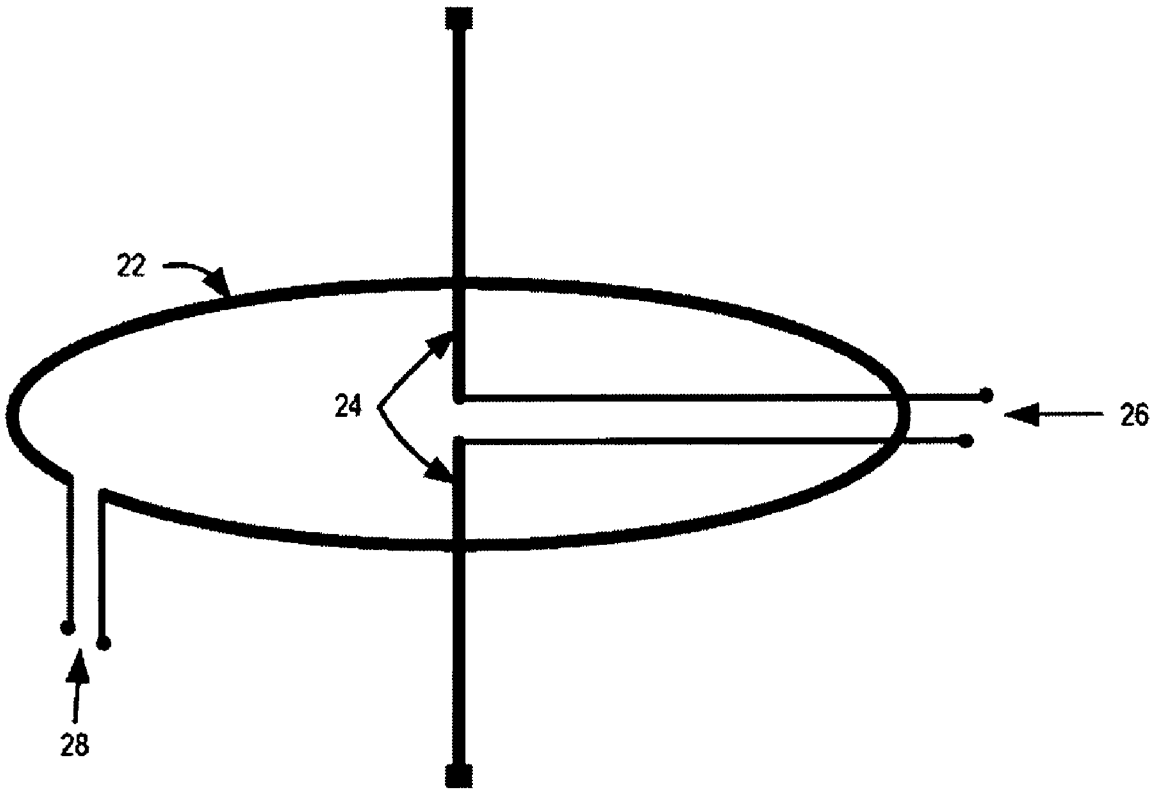
FIG. 5 is a drawing of an exemplary antenna configuration including a combination of loop antenna and a dipole implemented in accordance with one exemplary embodiment.

FIG. 5 shows one exemplary antenna assembly 20 which includes a loop antenna 22 and a dipole antenna 24 implemented in accordance with one exemplary embodiment. The loop antenna may be and, sometimes is, an Alford loop antenna. In the FIG. 5 embodiment, the loop antenna 22 has the coil portion of the loop antenna in a plane which is perpendicular to the upper and lower elements which make up dipole antenna 24. Thus, in the FIG. 5 antenna assembly 20, the dipole antenna which is an electrical antenna, has a polarization in a first direction. The loop antenna 22, which is a magnetic antenna, has a magnetic field direction which is in the same plane as the direction of polarization of the dipole antenna. While the loop antenna 22 is kept in a plane perpendicular to the dipole antenna 24, in some embodiments, it should be appreciated that the difference in the direction of the magnetic field of the loop antenna and the polarization direction of the dipole antenna may vary depending on the embodiment, e.g., with the range in directions being from 0 to 45 degrees. Such an arrangement allows the loop antenna to pick up electromagnetic waves polarized in a second direction while allowing the dipole antenna to pick up electromagnetic waves polarized in a different, e.g., first direction.

Such embodiments such as the one illustrated in FIG. 5 differ significantly from other systems which use a dipole antenna located in the same plane as is the loop of a magnetic antenna. In such systems both antennas pick up electromagnetic waves polarized in the same direction not different directions.

The output of the dipole antenna 24 may be recovered from terminals 26 shown in FIG. 5 while the output of the loop antenna may be recovered from terminals 28. In some embodiments, the dipole antenna 24 is used to recover vertically polarized electromagnetic waves while the loop antenna 22 is used to recover horizontally polarized electromagnetic waves. In such a case, the omni-directional nature of the dipole antenna 24 located in the vertical direction is combined with the omni-directional directivity pattern of the loop antenna in the horizontal direction providing good overall directivity for both vertically, and horizontally polarized waves.

Figure 6:
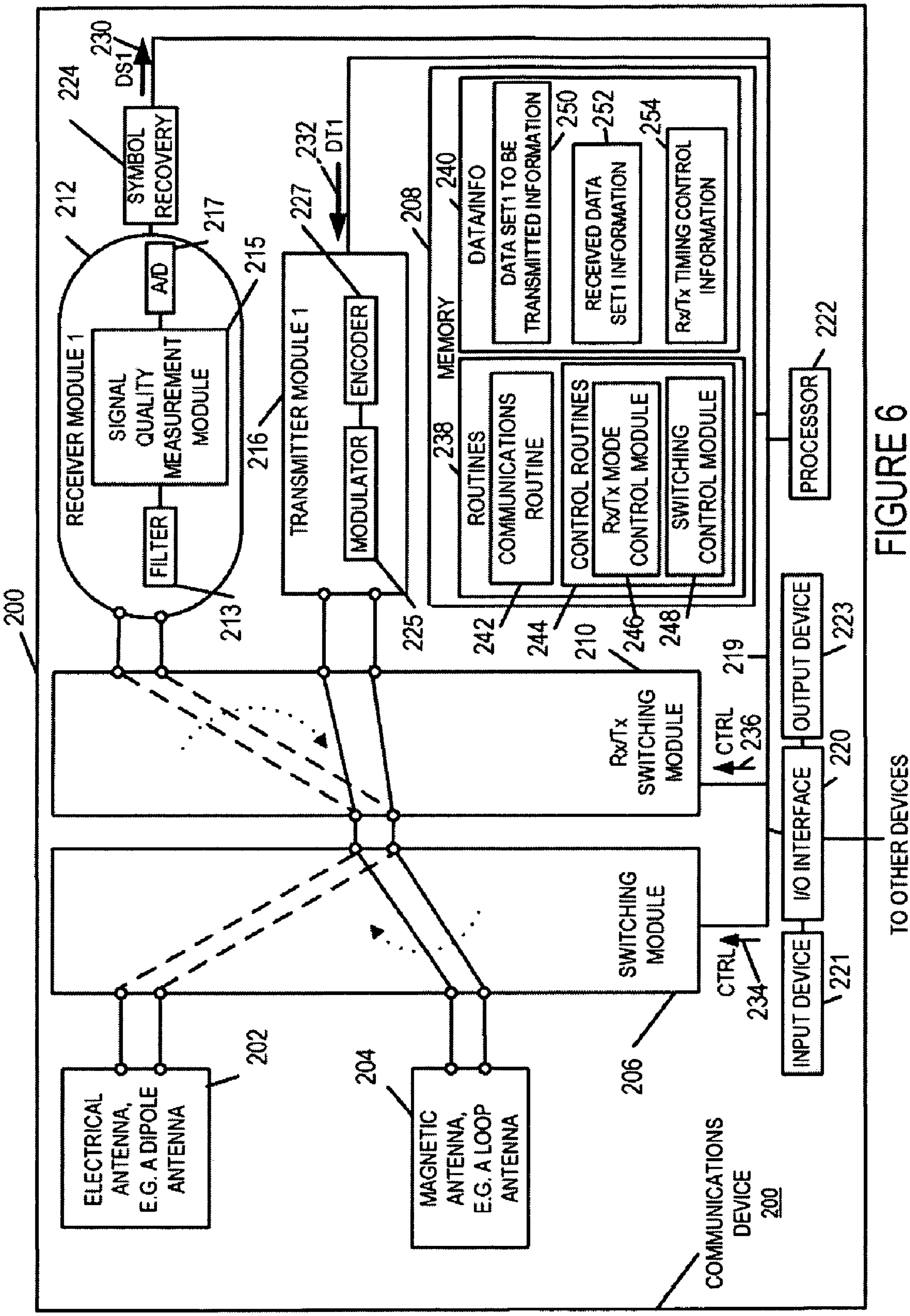
FIG. 6 illustrates an exemplary communications device implemented in accordance with one exemplary embodiment.

FIG. 6 shows a communications device 200 in which the antenna assembly 20 of FIG. 5 may be used. The exemplary communications device 200 includes an electrical antenna 202, e.g., a dipole antenna, and a magnetic antenna 204, e.g., a loop antenna or a slot antenna. The electrical antenna 202 has a polarization in a first direction and the magnetic antenna 204 has a magnetic field direction which is within 45 degrees of the first direction. In some embodiments, the first direction is substantially the same direction as the magnetic field direction. In some embodiments, the magnetic antenna 204 is an Alford loop antenna.

Device 200 also includes an antenna switching module 206, a first receiver/transmitter switching module 210, a receiver module 212, a transmitter module 216, a symbol recovery module 224, an Input/Output (I/O) interface 220, a processor 222 and a memory unit 208 coupled together via a bus 219 over which the various elements may communicate data and/or control information. The I/O interface 220 is coupled to an input device 221, e.g., keypad, and output device 223, e.g., display, which can be used by a user to interact with the communications device 200. In some embodiments, the I/O interface 220 has a connection for coupling the communications device 200 to other devices, e.g., by a wired connection. In some embodiments, the communications device 200 is implemented as a handheld wireless terminal.

As shown in FIG. 6, the electrical and magnetic antennas 202, 204 are coupled to the switching module 206 which is used to perform switching operations for selectively coupling one of the antennas 202, 204 to the transmitter or receiver module 212, 216 at a given point in time. The system shown in FIG. 6 is a time division duplexed embodiment where transmission and reception occur at different times. In such an embodiment, switching module 206 controls which one of the antennas 202, 204 is used while the Rx/Tx switching module 210 is used to control whether the selected antenna 202 or 204 is coupled to the receiver module 212 or transmitter module 216. In a frequency division duplex embodiment, transmission and reception may occur at the same time using different frequencies. In such an embodiment, transmission and reception may be implemented using the same one of the antennas 202, 204 or different ones of the antennas 202, 204 for transmission and reception.

The FIG. 6 embodiment may be described as a single receiver and transmitter chain embodiment because it includes a single receiver module 212 and a single transmitter module 216. The receiver module 212 includes what may be described as a chain of components, e.g. a filter 213, a signal quality measurement module 215 and an A/D converter 217 which has an output coupled to the symbol recover module 224. Signal quality measurement module 215 measures the signal quality, e.g., SNR, SIR, etc. of a received signal. In some embodiments, signal quality information is collected, e.g., corresponding to both alternative antennas (202, 204) to be used subsequently by switching control module 248. The symbol recovery module 224 may be implemented as an independent component coupled to the receiver module 212, or the symbol recovery module 224 may be included as part of the receiver module 212. The symbol recovery, module 224 recovers symbols from the signal or signals received by the antenna 202, 204 which supplies the input to the receiver module 212 at a given time. The symbols are used to communicate information e.g., from a base station. Data stream 1 (DS1) 230 represents a recovered symbol stream output by symbol recovery module 224.

The transmitter module 216, like the receiver module 212, includes what may be described as a chain of components, e.g. an encoder 227 and a modulator 225. The encoder 227 receives data to be transmitted, e.g., in the form of symbols from input symbol stream DT1 232. The encoder 227 performs an encoding operation, e.g., an LDPC encoding operation or other type of coding operation, to provide redundancy and passes the resulting symbols to the modulator 225. The modulator performs a modulation operation, e.g., a QAM or BPSK modulation operation to modulate the symbols to be transmitted on a carrier signal. The generated signal to be transmitted including the modulated symbols is then supplied via Rx/TX switching module 210 and switching module 206 to the antenna 202, 204 which is to be used at a given point in time.

Memory 208 includes routines 238 and data/information 240. The processor 222, e.g., a CPU, executes the routines 238 and uses the data/information 240 in memory 208 to control the operation of the communications device 200 and implement methods, e.g., the method of flowchart 1400 of FIG. 10.

Routines 238 include a communications routine 242 and control routines 244. The communications routine 242 implements the various communications protocols used by the communications device 200. Control routines 244 include a receiver/transmitter mode control module 246 and a switching control module 248. The data/information 240 includes data set 1 data/information to be transmitted 250, received data set 1 data/information 252 and RX/TX timing control information 254.

The Rx/Tx switching module 210 is controlled by the Rx/Tx mode control module 246. Based on the Rx/Tx timing control information 254, the Rx/Tx mode control module 246 sends a control signal 236 to the Rx/Tx switching module 210 to switch between receiver module 212 and transmitter module 216. When in the receive mode, a received signal can be recovered from the output of the receiver module 212 in the form of a digital signal which is then fed to the symbol recovery unit 224. Finally data stream 1 (DS1) 230 can be recovered from the symbol recovery module 224. Information recovered from data stream 1 230 is stored in memory as information 252. When in the transmit mode, signals communicating information 250 via transmission data DT1 232 can be generated and transmitted using the transmitter module 216.

Switching control module 248, which generates control signal 234, controls the antenna switching module 206 to switch between the electrical antenna 202 and the magnetic antenna 204. The switching control module 248 controls the switching module 206 to switch between the electrical antenna 202 and the magnetic antenna 204 based on one of a signal quality measurement and a received control signal.

Figure 7:
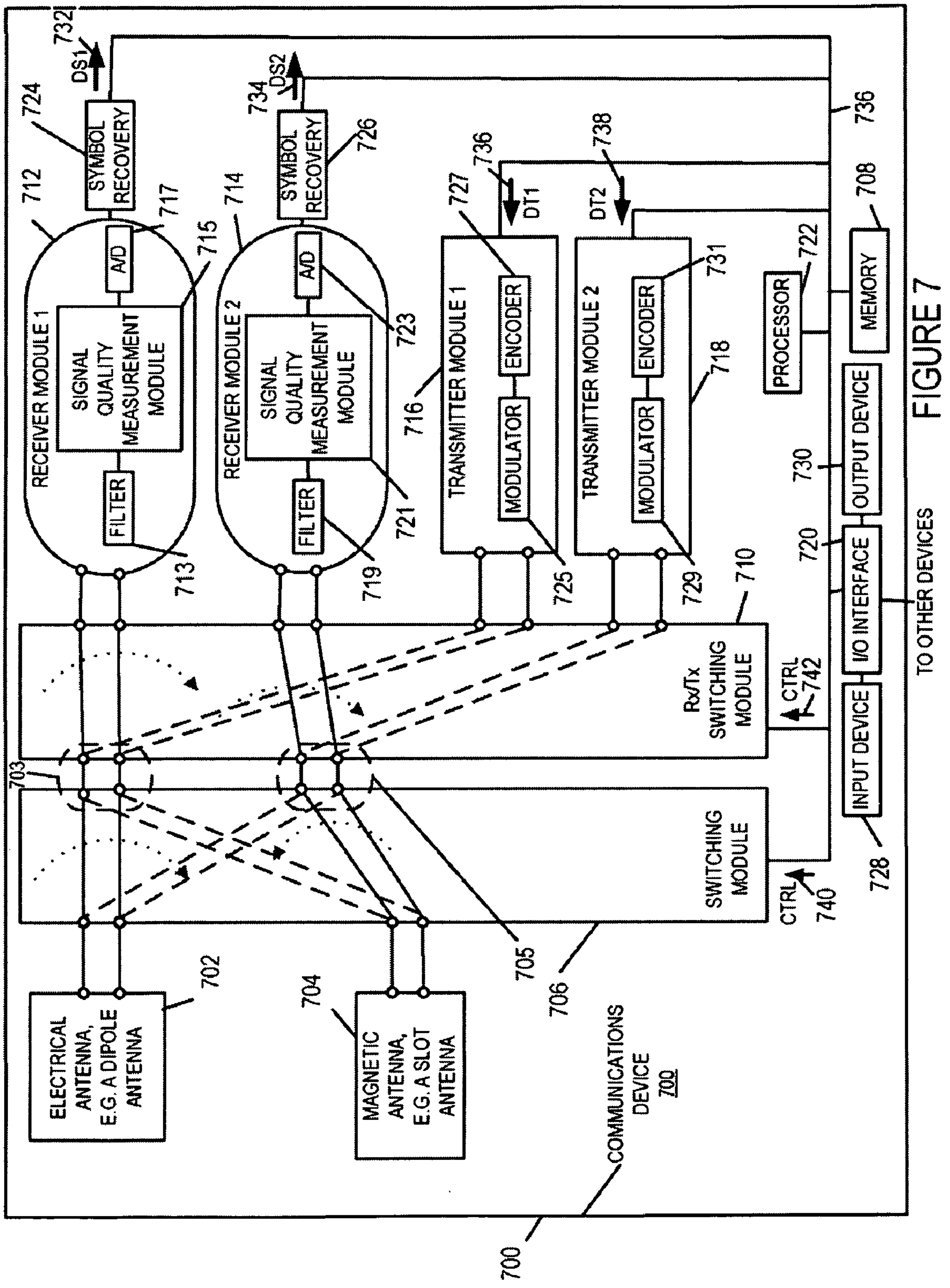
FIG. 7 illustrates another exemplary communications device.

FIG. 7 shows an exemplary communication device 700 comprising an electrical antenna 702, e.g. a dipole antenna and a magnetic antenna 704. e.g. a slot antenna or a loop antenna. The antenna pair combination (702, 704) may be, e.g., the antenna assembly 20 of FIG. 5. The electrical antenna 702 has a polarization in a first direction and the magnetic antenna 704 has a magnetic field direction which is within 45 degrees of the first direction. In some embodiments, the first direction is substantially the same direction as the magnetic field direction. In some embodiments, the magnetic antenna 704 is an Alford loop antenna.

Device 700 further comprises: a switching module 706, a receiver/transmitter switching module 710, a first receiver module 712, a second receiver module 714, a first transmitter module 716, a second transmitter module 718, a processor 722, an I/O interface 720, and a memory unit 708 coupled together via a bus 736 over which the various elements may interchange data and information. The I/O interface 720 is coupled to an input device 728, e.g., keypad, and output device 730, e.g., display, which can be used by a user to interact with the communications device 700. In some embodiments, the I/O interface 720 has a connection for coupling the communications device 700 to other devices, e.g., by a wired connection. In some embodiments, the communications device 700 is implemented as a handheld wireless terminal.

Electromagnetic waves (signals) are sent and received via the electrical and magnetic antennas 702 and 704 respectively. The switching module 706 is used to perform switching operations for selectively supplying the output of one of the said antennas (702, 704) to a first coupling point 703 of another switching device and for selectively supplying the other one of said antennas (702, 704) to a second coupling point 705 of said another switching device. The another switching device is in this case is Rx/Tx switching module 710. The Rx/Tx switching module 710 performs a switching operation by selecting between various receiver and transmitter modules (712, 714, 716, and 718) which may be selectively coupled to coupling points (703, 705). In some embodiments, a single switching module may be used in place of modules 706 and 710.

The first receiver module 712 includes internal components, e.g. a filter 713 to filter out the noise and other unwanted signals which get mixed with the message signal, a signal quality measurement module 715 and an A/D converter 717. The second receiver module 714 includes internal components, e.g. a filter 719 to filter out the noise and other unwanted signals which get mixed with the message signal, a signal quality measurement module 721 and an A/D converter 723. The signal quality measurement modules (715 and 721) function to measure the quality of the received signal in order to provide this information to a switching control module 760, which is one of the elements in the memory 708. Based on this information provided by the receiver module or modules, in some embodiments, switching control module 760 sends a control signal 740 to the switching module 706 to switch between the electrical antenna 702 and magnetic antenna 704. For example, information obtained from signal quality measurement modules (715, 721) may be used by switching control module 760 which decides to couple the magnetic antenna 704 to coupling point 703 and decides to couple the electrical antenna 702 to coupling point 705. Alternatively, the information obtained from signal quality measurement modules (715, 721) may be used by switching control module 760 which decides to couple the magnetic antenna 704 to coupling point 705 and decides to couple the electrical antenna 702 to coupling point 703.

Transmitter module 1 716 includes an encoder 727, e.g., an LDPC encoder or other type of encoder, for encoding data transmission stream 1 736 and generating coded bits, and a modulator 725 for generating modulation symbols which convey the coded bits. Transmitter module 2 718 includes an encoder 731, e.g., an LDPC encoder or other type of encoder, for encoding data transmission stream 2 738 and generating coded bits, and a modulator 729 for generating modulation symbols which convey the coded bits. The Rx/Tx switching module 710 is controlled by the Rx/Tx mode control module 758 including in memory 708. Based on the Rx/Tx timing control information 770, the Rx/Tx mode control module 758 sends a control signal 742 to the Rx/Tx switching module 710 to switch between the receiver and transmitter modules. In some embodiments, e.g., some TDD embodiments, the switching between receiving and transmission is controlled in accordance with a predetermined schedule stored as part of information 770.

Consider, e.g., that the communications device 700 operates in a TDD system. The RX/TX switching module 710 selects, under the control of signal 742, one of the following: (i) receiver module 1 712 is coupled to coupling point 703 and receiver module 2 719 is coupled to coupling point 705 or (ii) transmitter module 1 716 is coupled to coupling point 703 and transmitter module 2 718 is coupled to coupling point 705.

At times, receiver modules (712, 714) are coupled to the antennas (702, 704) via switching modules (706 and 710), with the switching module 710 enabling reception and the switching module 706 selecting the coupling between particular antennas and particular receiver modules. Received signals can be recovered from the output of the first receiver module 712 and the second receiver module 714 in the form of digital signals, which are input to the symbol recovery modules (724, 726), respectively. Data stream 1 (DS1) 732 and data stream 2 (DS2) 734 are recovered by the symbol recovery modules (724, 726), respectively. In some embodiments, the symbol recovery modules (724, 726) are included as part of receiver modules (712, 714), respectively.

At times, transmitter modules (716, 718) are coupled to the antennas (702, 704) via switching modules (706 and 710), with the switching module 710 enabling transmission and the switching module 706 selecting the coupling between particular antennas and particular transmitter modules. Thus, in some embodiments, generated modulation symbols conveying data transmission data stream 1 data 736 are conveyed over one of electrical antenna 702 and magnetic antenna 704, while generated modulation symbols conveying data transmission stream 2 data 738 are conveyed concurrently over the other one of electrical antenna 702 and magnetic antenna 704.

Figure 8:
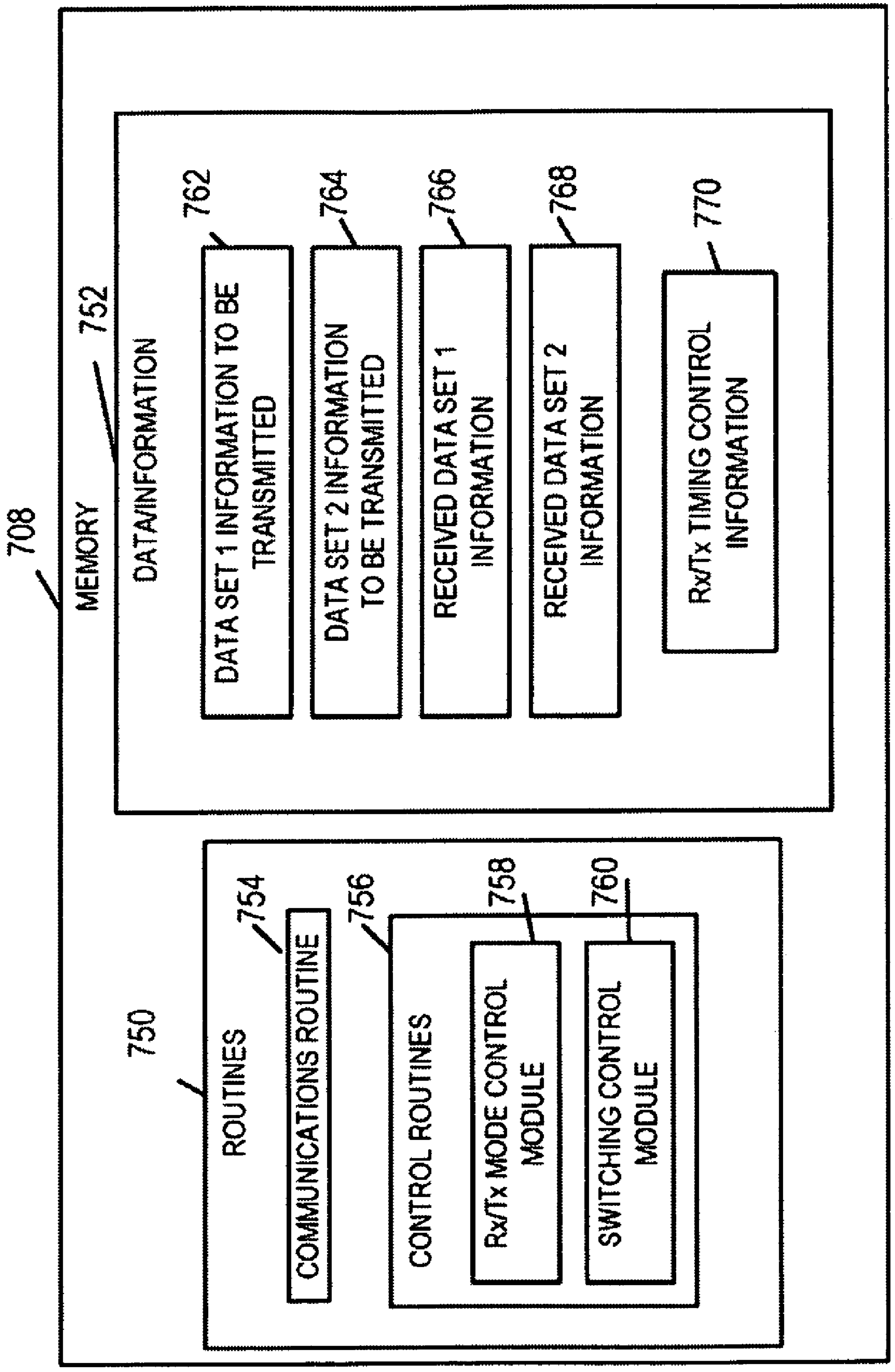
FIG. 8 illustrates the contents of an exemplary memory which may be used as the memory of the communications devices shown in FIG. 7.

FIG. 8 is a more detailed representation of memory 708. Memory 708 includes routines 750 and data/information 752. The processor 722, e.g., a CPU, executes the routines 750 and uses the data/information 752 in memory 708 to control the operation of the communications device 700 and implement methods. e.g., a method in accordance with flowchart 1500 of FIG. 11.

Routines 750 include a communications routine 754 and control routines 756. The communications routine 754 implements the various communications protocols used by the communications device 700. The control routines 756 include a RX/TX mode control module 758 and a switching control module 760. Data/information 752 includes data set 1 information to be transmitted 762, data set 2 information to be transmitted 764, received data set 1 information 766, received data set 2 information 768, and RX/TX timing control information 770. Information 762 includes stored information corresponding to DT1 736, while information 764 includes stored information corresponding to DT2 738. Thus first and second transmitter modules (716, 718) can, and sometimes do, receive different data streams for transmission Information 766 includes stored information corresponding to DS1 732, while information 768 includes stored information corresponding to DS2 734.

Figure 9:
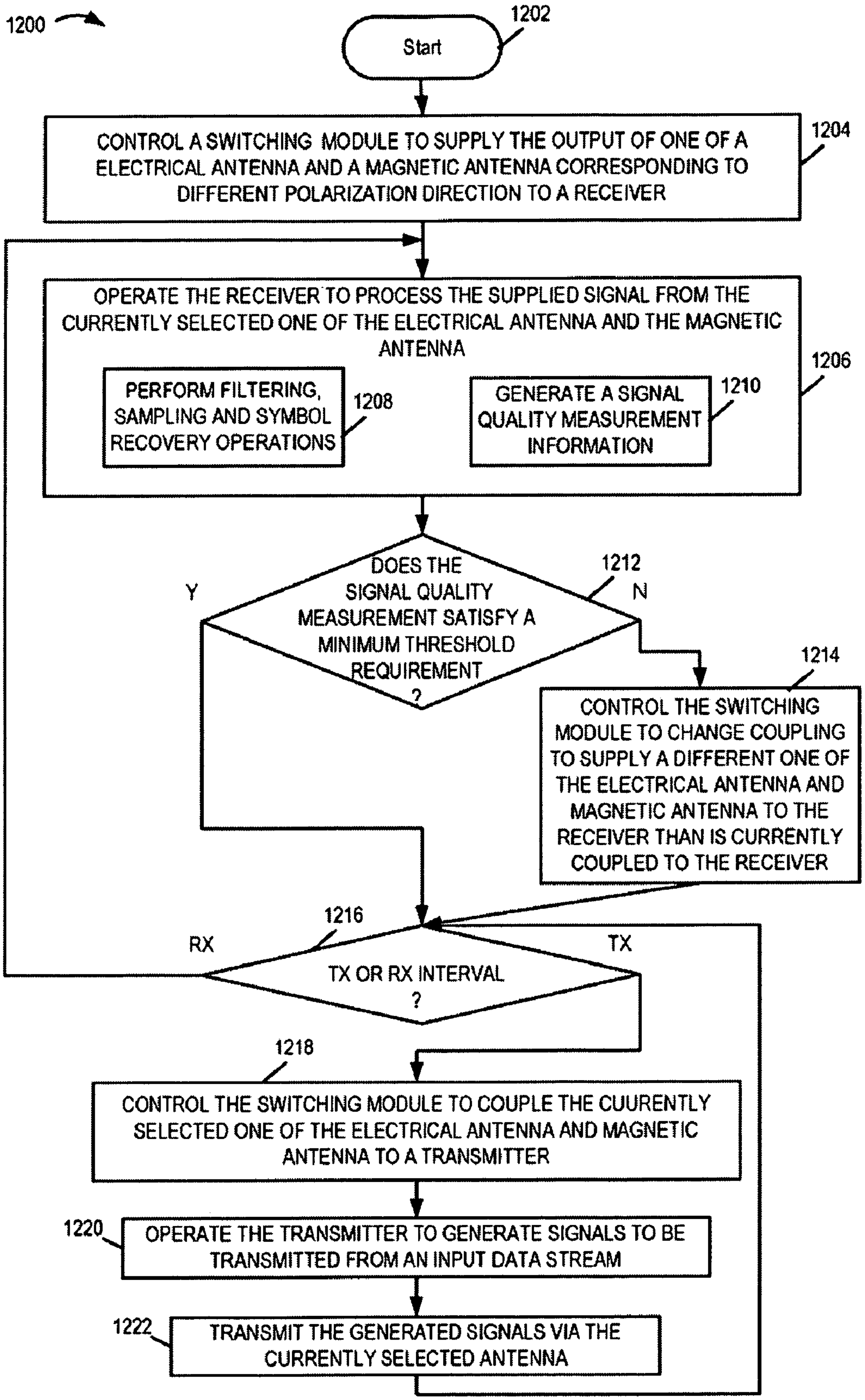
FIG. 9 illustrates a flowchart showing the steps of an exemplary method of operating a communications device in one exemplary embodiment.

FIG. 9 is a flowchart 1200 of an exemplary method of operating a communications device including two antennas which have different polarization directions in accordance with various embodiments. The two antennas include an electrical antenna having a first polarization direction and a magnetic antenna having a second polarization direction which is different from the first polarization direction.

Operation starts in step 1202, where the communications device, e.g., a portable handheld mobile wireless terminal, is powered on and initialized and proceeds to step 1204. In step 1204 the communications device controls a switching module to supply the output of one of the electrical antenna and the magnetic antenna to a receiver module. Then in step 1206, the communications device operates the receiver to process the supplied signal from the currently selected one of the electrical antenna and magnetic antenna. Step 1206 includes sub-steps 1208 and 1210 which may be performed serially or in parallel. In sub-step 1208, the receiver performs filtering, sampling and symbol recovery operations attempting to recover information corresponding to a data stream. In sub-step 1210 the communications device generates signal quality measurement information, e.g., information indicative of the success of the recovery operation, the SNR, the SIR, the channel conditions and/or the level of interference. Operation proceeds from step 1206 to step 1212.

In step 1212 the communications device determines whether or not the signal quality measurement of sub-step 1210 satisfies a minimum threshold requirement criteria. If the minimum criteria is satisfied then operation proceeds from step 1212 to step 1216; however if the minimum criteria is not satisfied, then operation proceeds from step 1212 to step 1214. In step 1214, the communications device controls the switching module to change the coupling to supply a different one of the electrical antenna and magnetic antenna to the receiver than is currently coupled to the receiver. Operation proceeds from step 1214 to step 1216.

In step 1216, the communications device determines whether the next interval corresponds to a transmit interval or a receive interval, e.g., in accordance with a predetermined TDD timing structure. If the next interval is to be a receive interval, then operation proceeds from step 1216 to step 1206 to operate the receiver to receive additional signals. However, if the next interval is a transmit interval, then operation proceeds from step 1216 to step 1218.

In step 1218 the communications device controls the switching module to couple the currently selected one of the electrical and magnetic antennas to a transmitter. Then, in step 1220 the communications device operates the transmitter to generate signals to be transmitted from an input data stream, and in step 1222 the communications device transmits the generated signals via the currently selected antenna. Operation proceeds from step 1222 to step 1216.

In one exemplary embodiments, the communications device performing the method of flowchart 1200 of FIG. 9 is device 200 of FIG. 6, the electrical antenna is antenna 202, the magnetic antenna is antenna 204, the switching module includes the composite of switching modules 206 and 210, the receiver module includes receiver module 1 212 and symbol recovery, module 224 and the transmitter module is module 216.

Figures 10, 10A:
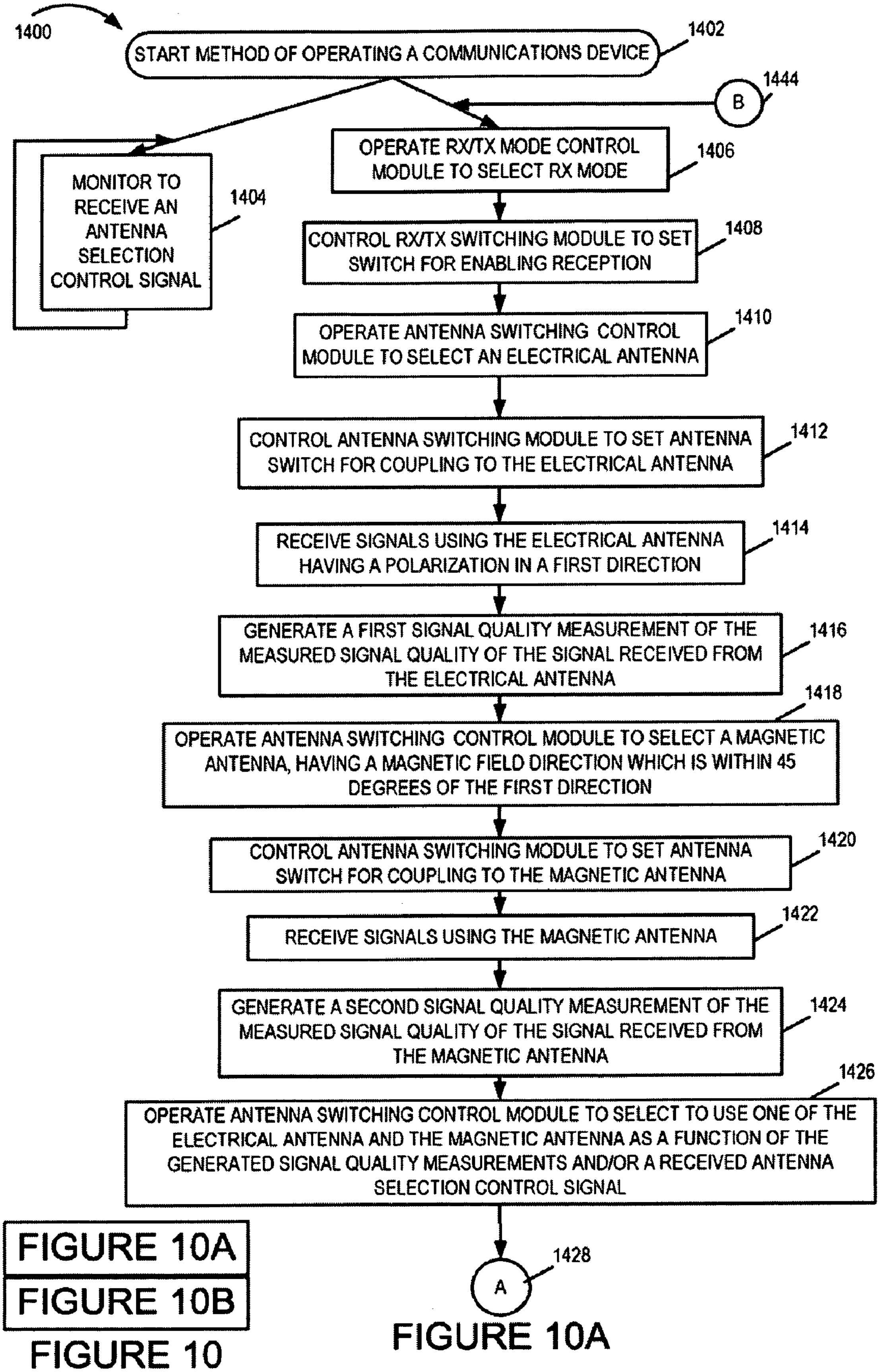
FIG. 10 comprising the combination of FIG. 10A
Figure 10B:
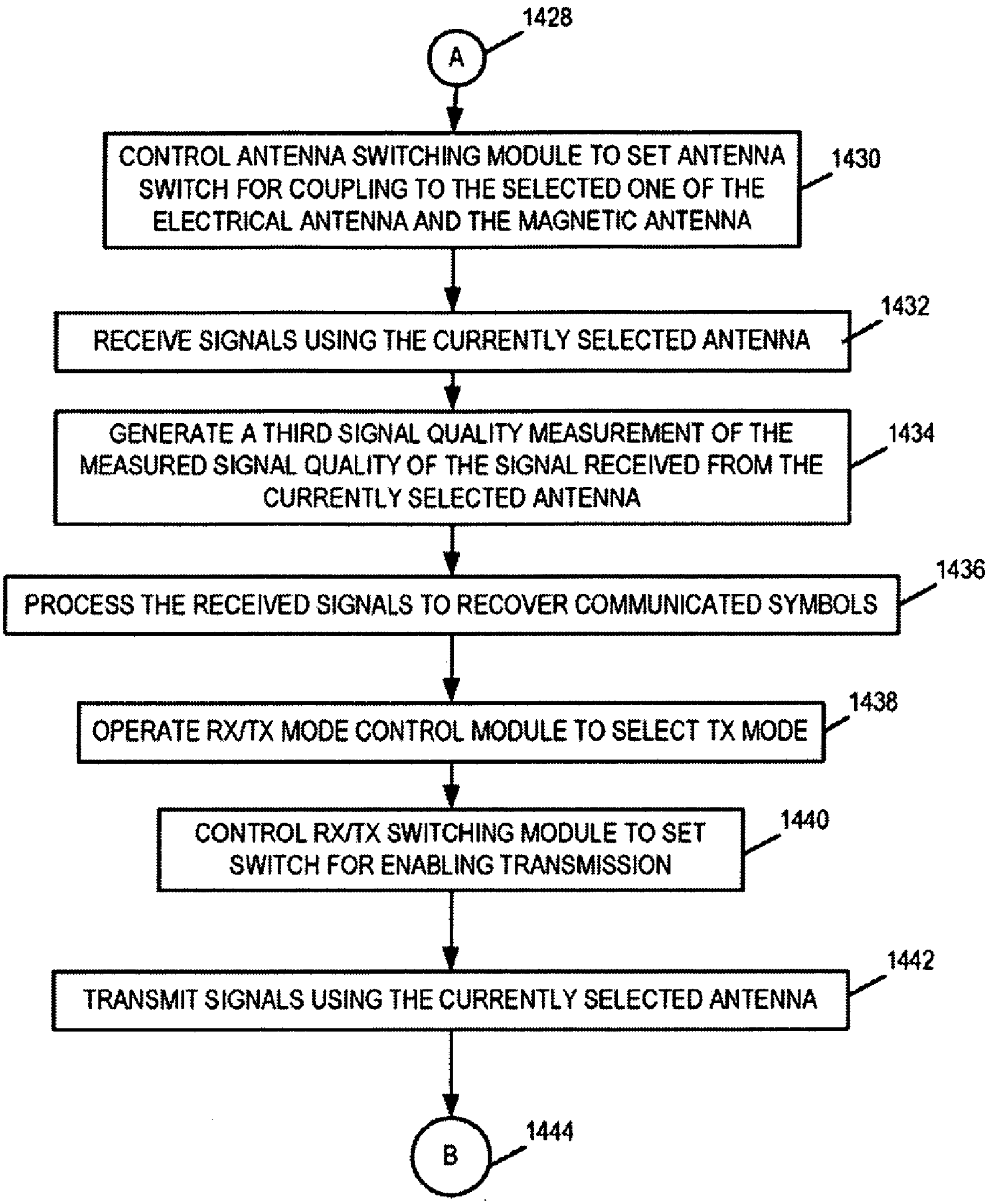
FIG. 10B is a flowchart of operating a communications device in accordance with an exemplary embodiment.

FIG. 10 comprising the combination of FIG. 10A and FIG. 10B is a flowchart 1400 of an exemplary method of operating a communications device, e.g., communications device 200 of FIG. 6. Operation starts in step 1402, where the communications device is powered on and initialized and proceeds to steps 1404 and 1406. In step 1404, which is performed on an ongoing basis, the communications device monitors to receive an antenna selection control signal. In step 1406, the communications device operates a receive/transmit control module, e.g., RX/TX mode control module 246 of device 200 of FIG. 6, to select the RX mode, e.g., in accordance with RX/TX timing control information, e.g., information 254. Then, in step 1408, the communications device controls the RX/TX switching module, e.g., module 210 of device 200 of FIG. 6, to set its switch for enabling reception. Operation proceeds from step 1408 to step 1410, in which the antenna switching control module, e.g., module 248 of device 200 of FIG. 6 is operated to select an electrical antenna. Then, in step 1412, the antenna switching module, e.g. module 206 of device 200 of FIG. 6, is operated to select the electrical antenna. Then, in step 1414, the communications device receives signals using the electrical antenna, e.g., antenna 202 of device 200 of FIG. 6, the electrical antenna having a polarization in a first direction. Operation proceeds from step 1414 to step 1416 in which the communications device generates a first signal quality measurement of the signal received from the electrical antenna. For example, the signal quality, measurement module 215 of device 200 of FIG. 6 measures the signal quality and generates a quality measurement indicator signal to be used subsequently by antenna switching control module 248 along with a received antenna selection control signal.

Operation proceeds from step 1416 to step 1418. In step 1418, the communications device operates the antenna switching control module, e.g. module 248, to select a magnetic antenna, e.g., magnetic antenna 204, having a magnetic field direction which is within 45 degrees of the first direction, e.g., the first direction and the magnetic field direction differ by an amount which has an absolute value in the range of 0 and 45 degrees. The magnetic antenna is, e.g., magnetic antenna 204 of device 200 of FIG. 6. In some embodiments, the difference is such that the polarization direction corresponding to the magnetic antenna is substantially orthogonal to the polarization direction associated with the electrical antenna.

Operation proceeds from step 1418 to step 1420. In step 1420 the antenna switching module, e.g. module 248, of the communications device is operated to set its switch for coupling to the magnetic antenna. Then, in step 1422 the communications device receives signals using the magnetic antenna, e.g., signals received by magnetic antenna 204 are fed as input to receiver module 212 for processing. In step 1424 the signal quality measurement module generates a second signal quality measurement from the measured signal quality of the signal received from the magnetic antenna. Then, in step 1426, the antenna switching control module selects to use one of the electrical antenna and the magnetic antenna as a function of the generated signal quality measurements, e.g., from steps 1416 and 1424, and/or a received antenna selection control signal from step 1404. Operation proceeds from step 1426, via connecting node A 1428, to step 1430.

In step 1430 the antenna switching module sets its antenna switch for coupling to the selected one of the electrical antenna and magnetic antenna. e.g., in response to control signal 234 from antenna switching control module 248. Then, in step 1432 the receiver module of the communications device receives signals using the currently selected antenna. Operation proceeds from step 1432 to step 1434, in which the signal quality measurement module generates a third signal quality measurement signal from the measured signal quality of the signal received from the currently selected antenna. This third signal quality measurement can be, and sometimes is, utilized subsequently by the antenna switching control module when making a switching decision. Operation proceeds from step 1434 to step 1436 in which the communications device processes the received signals to recover communicated symbols. The operations of step 1436 are performed, e.g., by receiver module 1 212 and symbol recovery module 224 of device 200 of FIG. 6.

Operation proceeds from step 1436 to step 1438, in which the communications device operates the RX/TX mode control module to select transmit mode. e.g., in accordance with a predetermined recurring timing structure. Then, the RX/TX switching module of the communications device is operated to set its switch to enable transmission, e.g., in response to control signal 236. Operation proceeds from step 1440 to step 1442. In step 1442, the communications device transmits signals using the currently selected antenna. For example, transmitter module 216 of device 200) of FIG. 6 generates signals from input information DT1 232 which it transmits over the currently selected antenna to which it is coupled via modules 210 and 206.

Operation proceeds from step 1442 via connecting node B 1444 to step 1406 for another iteration. As an example, consider two exemplary iterations with different antenna selections. In the first iteration, the device in step 1426 selects the electrical antenna and therefore processes signals received by the electrical antenna in step 1436 to recover symbols and provides signals to the electrical antenna for transmission in step 1442; however, in the second iteration the device in step 1426 selects the magnetic antenna and therefore processes signals received by the magnetic antenna in step 1436 and provides signals to the magnetic antenna for transmission in step 1442.

In various embodiments, steps 1406 to step 1426 are used to evaluate alternative antenna channels and to select an antenna to be used for subsequent traffic channel signaling, e.g., downlink and uplink traffic channel signals communicated in steps 1432 and 1442. In some embodiments, the electrical antenna is a dipole antenna and the magnetic antenna is one of a loop antenna and a slot antenna. In some such embodiments, the magnetic antenna is an Alford loop antenna.

Figure 11A:
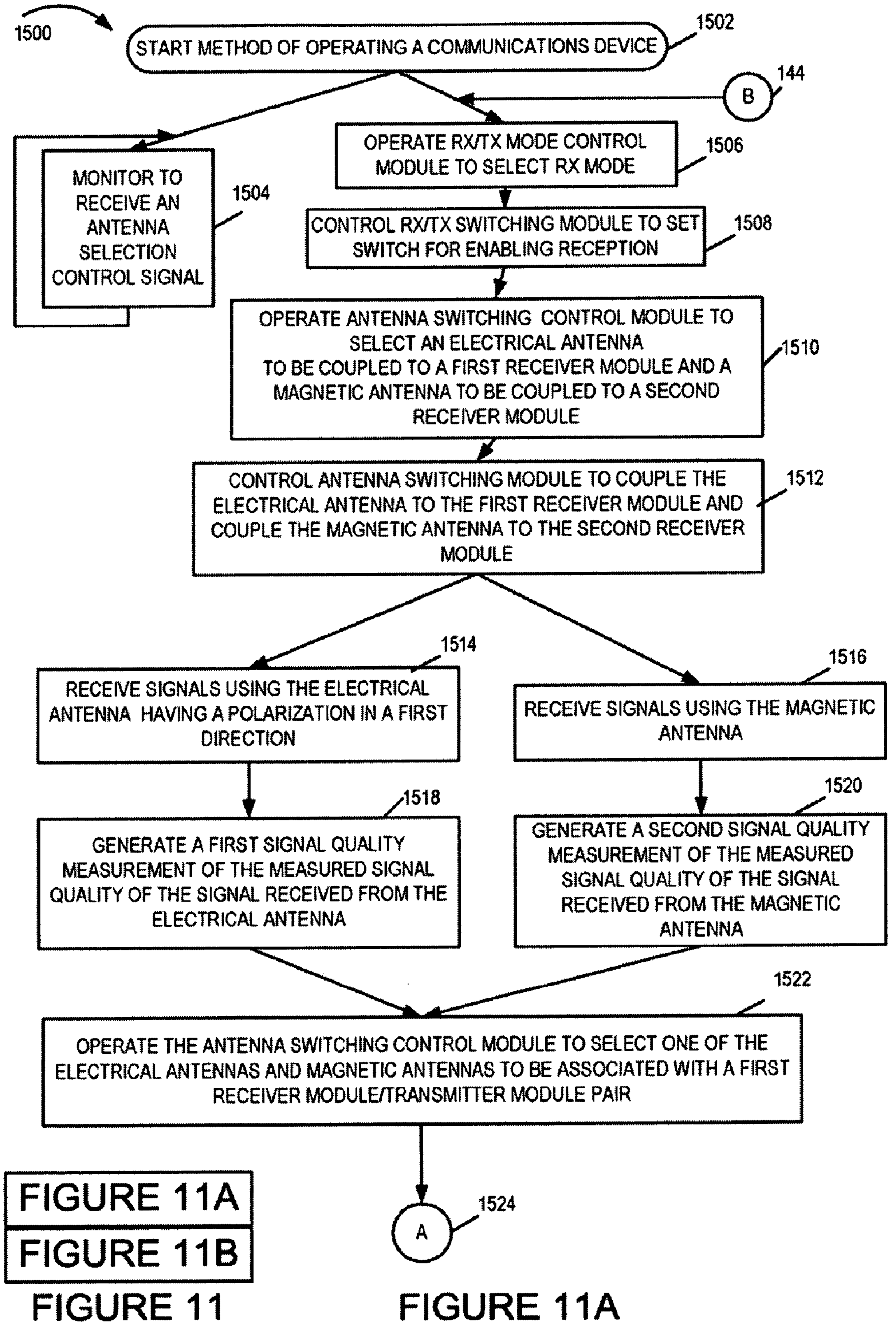
FIG. 11 comprising the combination of FIG. 11A
FIG. 11B is a flowchart of operating a communications device in accordance with an exemplary embodiment.
Figure 11B:
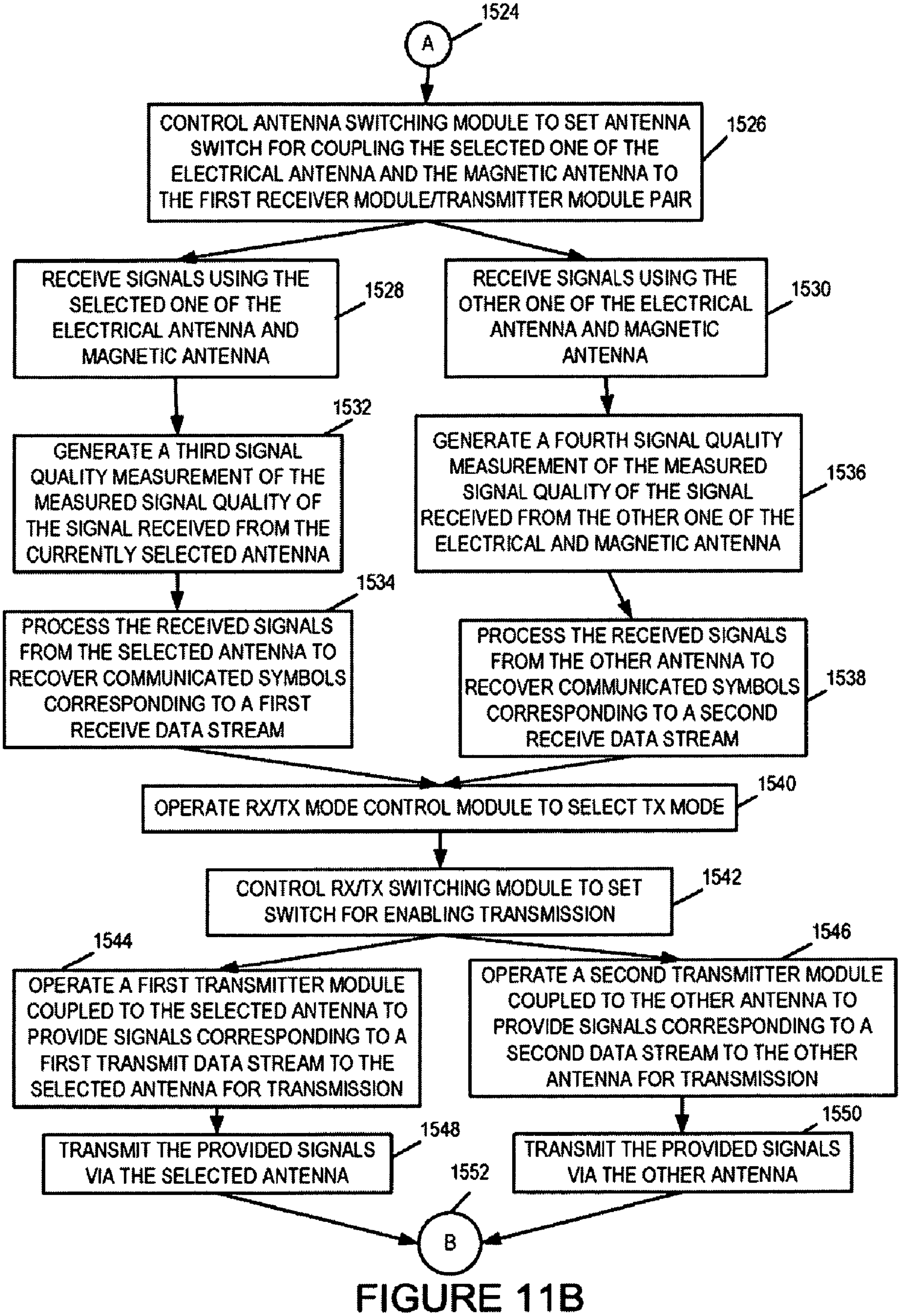

FIG. 11 comprising the combination of FIG. 11A and FIG. 11B is a flowchart 1500 of an exemplary method of operating a communications device in accordance with an exemplary embodiment, e.g., a handheld wireless communications device. The communications device is, e.g., communications device 700 of FIG. 7 including an electrical antenna 702, e.g., a dipole antenna, and a magnetic antenna 704, e.g., a slot antenna or a loop antenna, wherein the electrical antenna has a polarization in a first direction and the magnetic antenna has a magnetic field direction which is within 45 degrees of the first direction. In some embodiments, the magnetic antenna is an Alford loop antenna.

Operation starts in step 1502 where the communications device is powered on and initialized and proceeds to steps 1504 and step 1506. In step 1504, which is performed on an ongoing basis, the communication device monitors to receive an antenna selection control signal. In step 1506, a receive/transmit mode control module, e.g., module 758, is operated to select receive mode, e.g., in accordance with a predetermined timing structure in information 770. Then, in step 1508, a receive/transmit switching module, e.g., module 710 sets its switch to enable reception, e.g., in response to a control signal from the RX/TX mode control module 758. Operation proceeds from step 1508 to step 1510. In step 1510 an antenna switching control module, e.g., module 760, selects the electrical antenna to be coupled to a first receiver module, e.g., module 712 and selects the magnetic antenna to be coupled to the second receiver module, e.g., module 714. Operation proceeds from step 1510 to step 1512. In step 1512 an antenna switching module, e.g. module 706 is controlled to couple the electrical antenna to the first receiver module and to couple the magnetic antenna to the second receiver module. Operation proceeds from step 1512 to steps 1514 and 1516, which are performed in parallel.

In step 1514, the communications device, using the electrical antenna having a polarization in a first direction receives signals, and then in step 1518, a first signal quality measurement module, e.g., module 715 of receiver module 712, generates a first signal quality measurement of the signal received from the electrical antenna.

In step 1516, the communications device, using the magnetic antenna having a magnetic field direction which is within 45 degrees of the first direction, receives signals. Then in step 1520, a second signal quality measurement module, e.g., module 721 of receiver module 714, generates a second signal quality measurement of the signal received from the magnetic antenna. Operation proceeds from steps 1518 and 1520 to step 1522.

In step 1522, the antenna switching control module of the communications device selects one of the electrical antenna and the magnetic antenna to be associated with a first receiver module/transmitter module pair. The selection is made, e.g., based on the signal quality measurements and/or the received antenna selection control signal. In some embodiments the received antenna selection control signal can override a signal quality measurement based selection. By default, the other one of the electrical antenna and magnetic antenna will be associated with a second receiver module/transmitter module pair. In some embodiments, different receiver/transmitter pairs are different types. For example, one receiver/transmitter modulator pair may use different coding schemes, different coding rates, and/or different modulation constellations than another receiver transmitter pair. In another example, one receiver/transmitter pair may be able to handle higher data rates than the other receiver/transmitter pair. In still another example, one receiver transmitter pair may use different filters than another receiver/transmitter pair. In yet another example, one receiver/transmitter pair may be configured for a first set of power levels while the other is configured for different power levels. In another example, a first receiver/transmitter pair has different recovery capabilities than a second receiver/transmitter pair, e.g., it is more tolerant to background noise and/or interference. Operation proceeds from step 1522, via connecting node A 1524, to step 1526.

In step 1526 the antenna switching module implements the selection of the antenna switching control module, thus setting its switch for coupling of the selected one of the electrical antenna and the magnetic antenna to the first receiver module/transmitter module pair, interface, e.g. interface 703 used for coupling to the first receiver module 712 or the first transmitter module 716. The switching also results in the switch setting for coupling the other one of the electrical antenna and magnetic antenna to the second receiver module/transmitter module pair interface, e.g. interface 705 used for coupling to second receiver module 714 or second transmitter module 718

Operation proceeds from step 1526 to steps 1528 and 1530 which are performed in parallel. In step 1528 the first receiver module of the communications device receives signals using the selected one of the electrical antenna and the magnetic antenna. Then, in step 1532 the first signal quality measurement module, e.g., module 715 generates a third signal quality measurement of the measured signal quality of the received signal of step 1528, and in step 1534 the first receiver module and first symbol recovery module, e.g., modules 712 and 1714, process the received signals from the selected antenna to recover communicated symbols corresponding to a first receive data stream.

In step 1530 the second receiver module of the communications device receives signals using the other one of the electrical antenna and the magnetic antenna. Then, in step 1532 the second signal quality measurement module, e.g., module 721 generates a fourth signal quality measurement of the measured signal quality of the received signal of step 1530, and in step 1538 the second receiver module and second symbol recovery module, e.g., modules 714 and 726, process the received signals from the other antenna to recover communicated symbols corresponding to a second receive data stream.

Operation proceeds from steps 1534 and 1538 to step 1540, in which the RX/TX mode control module selects the transmit mode, e.g., in accordance with a predetermined timing TDD timing structure in information 770. Operation proceeds from step 1540 to step 1542. In step 1542 the RX/TX switching module of the communications device sets its switch to enable transmission, e.g., in response to a control signal from the RX/TX control module. Operation proceeds from step 1542 to step 1544 and step 1546 which are performed in parallel.

In step 1544, the first transmitter module, e.g., module 716, which is coupled to the selected antenna is operated to provide signals corresponding to a first transmit data stream to the selected antenna for transmission, and in step 1548 the provided signals are transmitted via the selected antenna.

In step 1546, the second transmitter module, e.g., module 718, which is coupled to the other antenna is operated to provide signals corresponding to a second transmit data stream to the other antenna for transmission, and in step 1550 the provided signals are transmitted via the other antenna.

Operation proceeds from steps 1548 and 1550, via connecting node B 1552 to step 1506 for another iteration. As an example, consider two exemplar) iterations with different antenna selections. In the first iteration, the device in step 1522 selects the electrical antenna and therefore the first receiver module processes signals received by the electrical antenna to recover symbols and the first transmitter module provides signals to the electrical antenna for transmission; while the second receiver module processes signals received by the magnetic antenna to recover symbols and the second transmitter module provides signals to the magnetic antenna for transmission. However, in the second iteration, the device in step 1522 selects the magnetic antenna and therefore the first receiver module processes signals received by the magnetic antenna to recover symbols and the first transmitter module provides signals to the magnetic antenna for transmission; while the second receiver module processes signals received by the electrical antenna to recover symbols and the second transmitter module provides signals to the electrical antenna for transmission.

In various embodiments, steps 1506 to step 1526 are used to evaluate alternative antenna channels and to select an antenna to be used for subsequent traffic channel signaling to be associated with the first receiver/transmitter pair, e.g., steps 1528 and 1548. The second receiver/antenna pair is, in this embodiment by default associated with the other antenna, and is to be used for subsequent traffic channel signaling to be associated with the second receiver/transmitter pair, e.g., steps 1530 and 1550.

In some embodiments, the electrical antenna is a dipole antenna and the magnetic antenna is one of a loop antenna and a slot antenna. In some such embodiments, the magnetic antenna is an Alford loop antenna.

Figure 12:
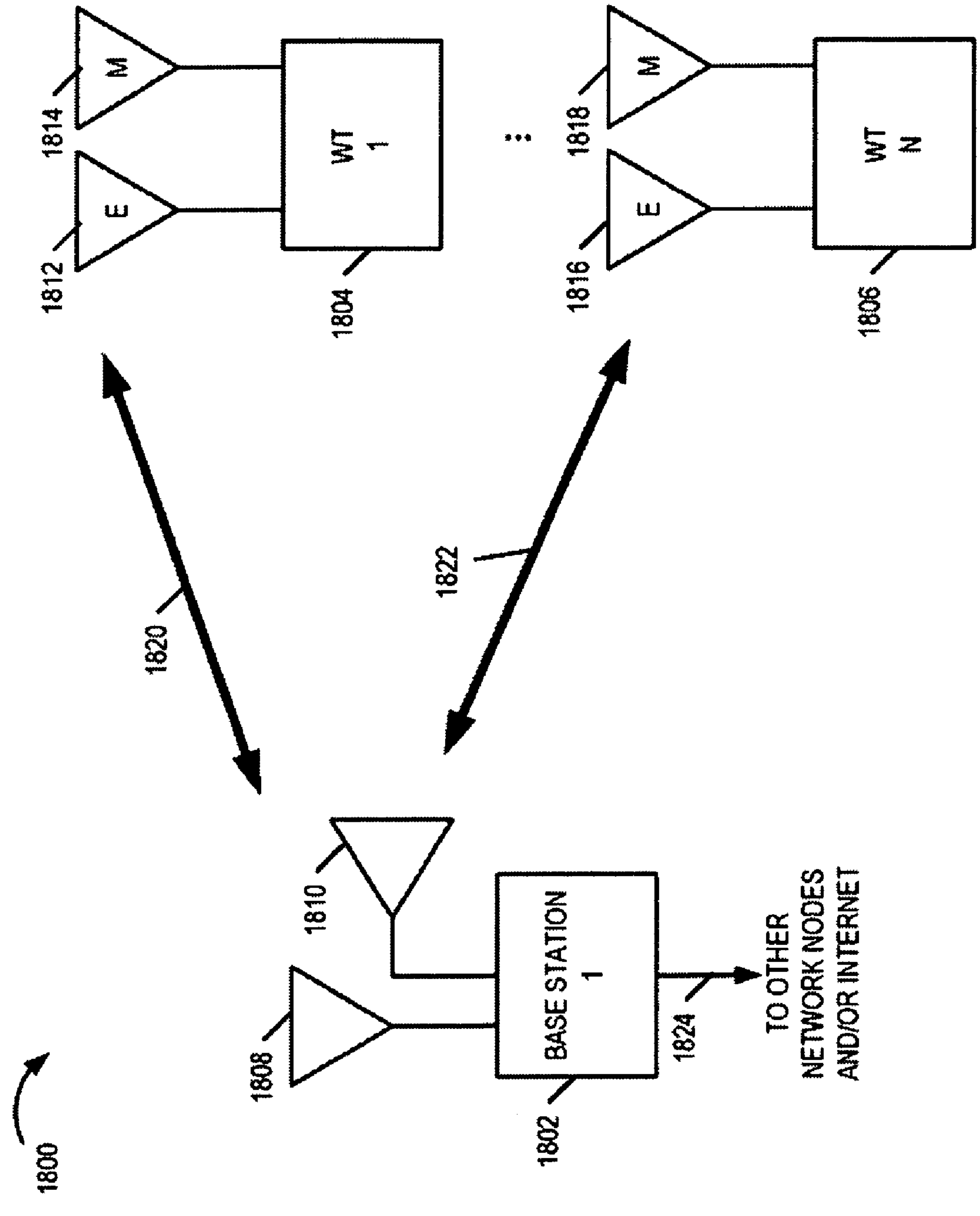
FIG. 12 is a drawing of an exemplary communications system in accordance with various exemplary embodiments.

FIG. 12 is a drawing of an exemplary communications system 1800 in accordance with various embodiments. Exemplary communications system 1800 includes a base station 1802 and a plurality of wireless terminals (WT 1 1804, . . . , WT N 1806). Base station 1 1802 includes antennas with different polarization directions (antenna 1808, antenna 1810). WT 1 1804 includes an electrical antenna 1812 and a magnetic antenna 1814. Similarly, WT N 1806 includes an electrical antenna 1816 and a magnetic antenna 1818. WT 1 1804 is coupled to BS 1 1802 via wireless link 1820. WT N 1806 is coupled to BS 1 1802 via wireless link 1822. BS 1 1802 is coupled to other network nodes, e.g., other base stations, routers, AAA nodes, home agent nodes, etc., via network link 1824.

The exemplary wireless terminals (1804, 1806) are, e.g., wireless terminals in accordance with the implementation of one or more of: WT 200 of FIG. 6, WT 700 of FIG. 7, the method of flowchart 1200 of FIG. 9, the method of flowchart 1400 of FIG. 10 and the method of flowchart 1500 of FIG. 11. In some embodiments, an electrical/magnetic antenna pair of a wireless terminal, e.g., antenna pair 1812/1814 of WT 1 1804, is in accordance with antenna implementation 20 of FIG. 5.

Figure 13:
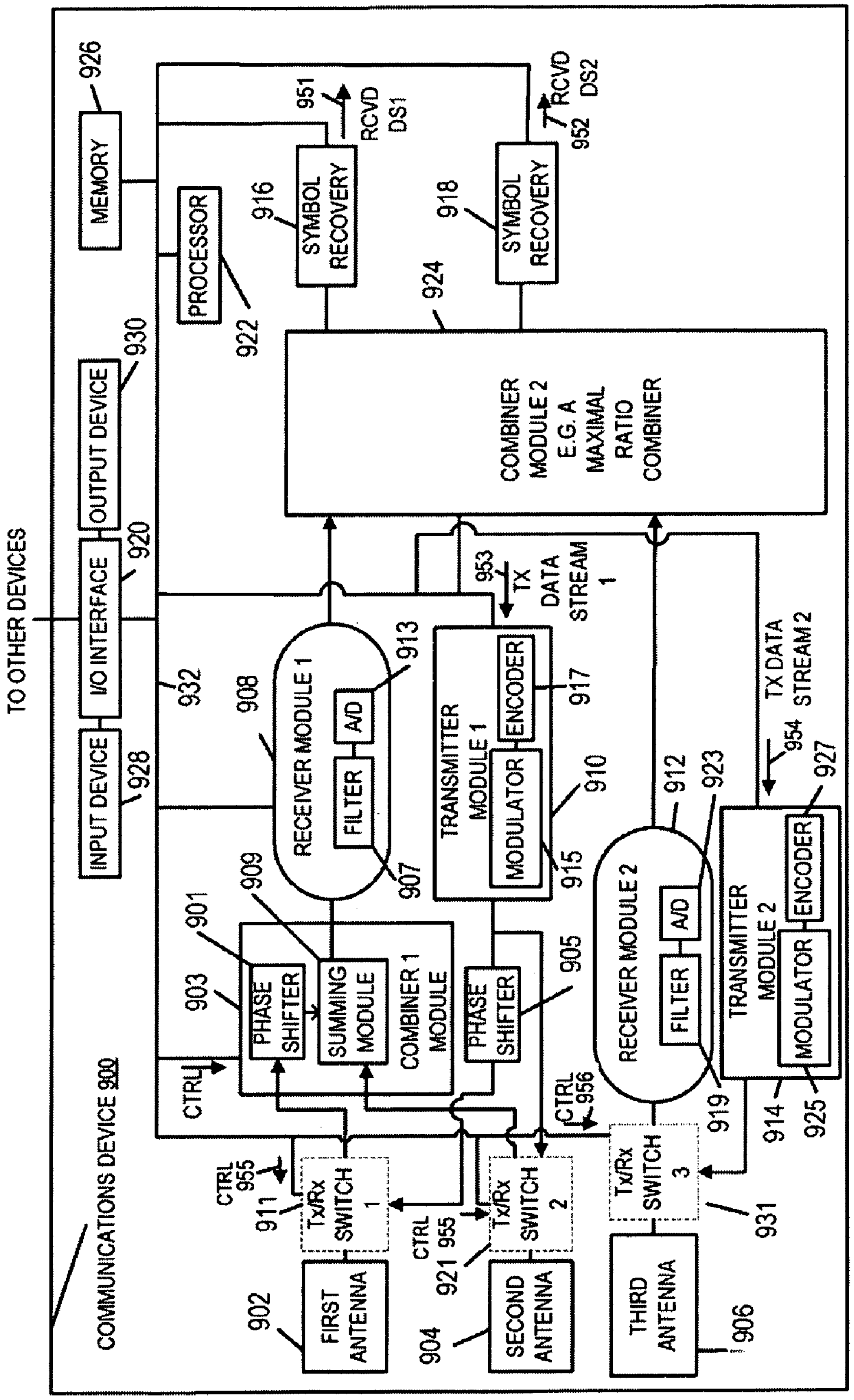
FIG. 13 illustrates an exemplary communications device implemented in accordance with yet another embodiment.

FIG. 13 shows an exemplary communication device 900 in accordance with an exemplary embodiment. The exemplary communications device 900 includes a first electrical antenna 902, a second electrical antenna 904, a third electrical antenna 906 and a phase shifter 905. The device 900 further includes a first combiner module 903, a first receiver module 908, a first transmitter module 910, a second receiver module 912, a second transmitter module 914, a second combiner module 924, a first symbol recovery modules 916, a second symbol recovery module 918, an I/O interface 920, a first Tx/Rx switch 911, a second Tx/Rx switch 921, a third Tx/Rx switch 931, a processor 922 and memory 926 coupled together via a bus 932 over which the various elements may exchange data and information. Device 900 further includes an input device, e.g., a keyboard 928, and an output device 930, e.g., a display, coupled to I/O interface 930 via which a user may interact with device 900. In some embodiments, the I/0 interface 920 couples communications device 900 to other network nodes and/or the Internet, e.g., via a wired connection.

First antenna 902 is coupled to Tx/Rx switch 1 911 which is coupled to an input of phase shifter 901 of combiner 1 module 903. Second antenna 904 is coupled to Tx/Rx switch 2 921 which is coupled to an input of summing module 909 of combiner 1 module 903. The output of phase shifter 901 is coupled to another input of summing module 909. The output of the summing module 909 is coupled to an input of receiver module 1 908. Third antenna 906 is coupled to Tx/RX switch 3 931 which is coupled to an input of receiver module 2 912. The output of receiver module 1 908 is coupled to an input of combiner module 2 924. The output of receiver module 2 912 is coupled to another input of combiner module 2 924. A first output of combiner module 2 924 is coupled to an input of symbol recovery module 916, while a second output of combiner module 2 924 is coupled to an input of symbol recovery module 918. Received data stream 1 (DS1) 951 is an output of symbol recovery module 916, while received data stream 2 (DS2) 952 is an output of symbol recovery module 918.

Transmit data stream 1 953 is an input to transmitter module 1 910. The output of transmitter module 1 910 is coupled to the input of phase shifter 905 and to an input of Tx/Rx switch 2 921. Transmit data stream 2 954 is an input to transmitter module 2 914. The output of phase shifter 905 is coupled to an input of Tx/Rx switch 1 911. The output of transmitter module 2 914 is coupled to an input of Tx/Rx switch 3 931.

The first electrical antenna 902 has a polarization in a first direction. The second electrical antenna 904 has a polarization in a second direction. The third antenna 906 has a polarization in a third direction. In various embodiments, the first, second and third polarization directions are different from one another, e.g., different from one another by more than 45 degrees. In some embodiments, the angle between the first polarization direction associated with the first antenna 902 and the second polarization direction associated with the second antenna 904 is in the range of 80 and 100 degrees. For example, the first antenna 902 and the second antenna 904 may be horizontal polarization direction antennas and the third antenna 906 may be a vertical polarization direction antenna.

The phase shifter 905 introduces a phase shift of a predetermined amount, said predetermined amount being a function of the angle between the first and second directions. For example, in one exemplary embodiment, the angle between the first and second directions is 90 degrees and the phase shift is 90 degrees.

First receiver module 908 is coupled to an output of combiner module 1 903. The first combiner module 903 combines signals from the first and second antenna (902, 904). The combiner module 903 includes phase shifter 901 for shifting the signal from the first antenna 902 prior to combing with the signal from the second antenna 904. Summing module 909, also included in combiner module 903 combines the phase shifted signal from the first antenna 902 with the signal from the second antenna 904 to produces a combined signal which is an output of combiner module 1 903 and an input to receiver module 1 908.

The second receiver module 912 is coupled to the output of the third antenna 906 via Tx/Rx switch 3 931. Combiner module 2 924 is coupled to the first and second receiver modules (908, 912). Combiner module 2 924 combines signals generated by the first and second receiver modules (908, 912) from the combined output of the first and second antennas (902, 904) and the output of the third antenna (906), respectively. In various embodiments, the second combiner 924 is a maximal ratio combiner or a minimum mean square combiner.

The output of the first transmitter module 910 is coupled to the second antenna 904 via Tx/Rx switch 2 921. The output of the first transmitter module 910 is also coupled to a first antenna 902 by way of phase shifter 905 and Tx/Rx switch 911.

As shown in FIG. 13, the first and second electrical antennas i.e. 902 and 904 are coupled to the first Tx/Rx switch 911 and second Tx/Rx switch 921, respectively. The switches (911, 921) will perform a switching operation and will select between the receiver module 1 908 and the transmitter module 1 910 based on the control signal 955 supplied to the switches (911, 921). Similarly, the third electrical antenna 906 is coupled to the third Tx/Rx switch 931 which will perform a switching operation and select between the receiver module 2 912 and the transmitter module 2 914 based on the control signal 956 supplied to the snitch 931.

Exemplary reception will be described. The Rx/Tx switches (911, 921, 931) have been commanded in the RX mode position. First antenna 902 receives a signal; the Tx/Rx switch 911 feeds it to the first combiner module 903. The first combiner module 903 includes a phase shifter 901 and a summing module 909. The phase shifter 901 shifts the phase of the incoming signal from the first antenna 902. The phase shifter 901 introduces a phase shift which is a function of the angle between the first and second antenna directions. The second antenna 904 concurrently receives a signal; the Rx/Tx switch 921 feeds it to the first combiner module 903. The phase shifted signal corresponding to the first antenna 902 and the signal corresponding to the second antenna 904 are fed to the summing module 909 to produce a combined signal.

This combined signal is then fed to the first receiver module 908. The first receiver module 908 includes a filter 907 and an analog to digital (A/D) converter 913. The signals received as input by the first receiver module 908 are processed, i.e. first the received signal is subjected to filtering operation by the filter 907 in the receiver module 908 in order to suppress the unwanted signals and/or noise, and then the A/D 913 performs an analog to digital conversion to obtain a digital signal.

The second receiver module 912 includes a filter 919 and an analog to digital (A/D) converter 923. The signals received as input to the second receiver module 912 are processed, i.e. first the received signal is subjected to filtering operation by the filter 919 in the receiver module 912 in order to suppress the unwanted signals and/or noise, and then the A/D 923 performs an analog to digital conversion to obtain a digital signal.

The digital signals from the first receiver module 908 and the second receiver module 912 are input to the second combiner module 924, where the received data streams are separated out and finally fed to the symbol recovery modules 916 and 918. Finally data stream 1 (DS1) 951 and data stream 2 (DS2) 952 are recovered from the symbol recovery modules (916, 918), respectively.

Exemplary transmission will be described. The Rx/Tx switches (911, 921, 931) have been commanded in the Tx mode position. Transmit data stream 1 953 is input to transmitter module 1 910. Transmitter module 1 910 includes an encoder 917 and a modulator 915. The encoder 917, e.g., an LDPC encoder, converts information bits of data stream 1 953 into coded bits which are input to modulator 915 which generates a modulated signal to convey the codes bits. The output signal from transmitter module 1 910 is fed to the second antenna 904 via the Tx/Rx switch 921, for transmission. The output signal from the transmitter module 1 910 is also fed to phase shifter 905, which performs a phase shift operation wherein the amount of phase shift is a function of the polarization direction difference between the first and second antennas (902, 904). The output of the phase shifter 905 is fed to the first antenna 902, via Tx/Rx switch 911 for transmission.

Transmit data stream 2 954 is input to transmitter module 2 914. Transmitter module 2 914 includes an encoder 927 and a modulator 925. The encoder 927, e.g., an LDPC encoder, converts information bits of data stream 2 954 into coded bits which are input to modulator 925 which generates a modulated signal to convey the codes bits. The output signal from transmitter module 2 914 is fed to the third antenna 906 via the Tx/Rx switch 931, for transmission.

Figure 14:
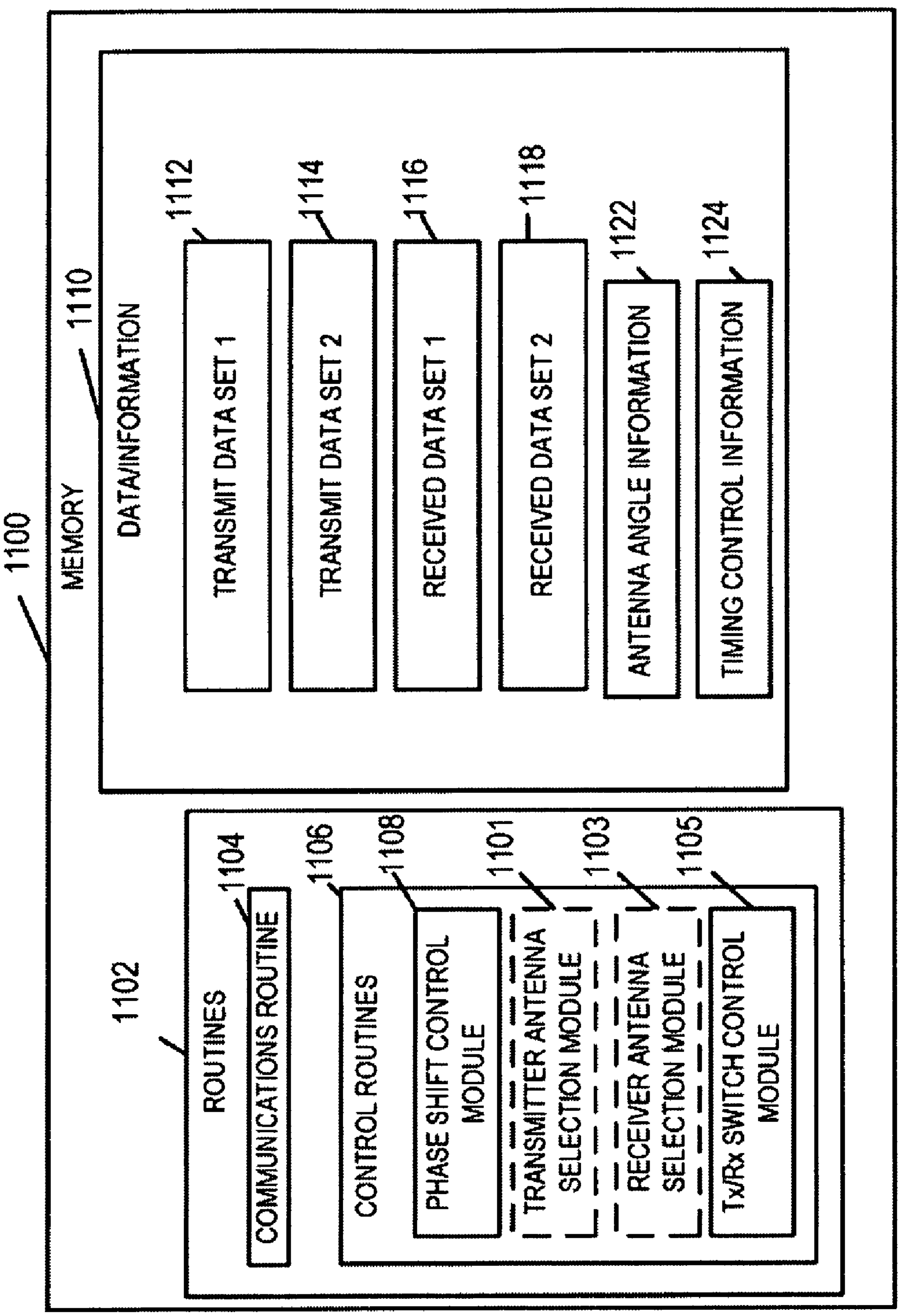
FIG. 14 illustrates an exemplary memory which may be used in the communications device shown in FIG. 13.

Memory 926 is, e.g., exemplary memory 1100 of FIG. 14. Memory 1100 includes routines 1102 and data/information 1110. The processor 922, e.g., a CPU, executes the routines 1102 and uses the data/information 1110 in memory 1100 to control the operation of the communications device 900 and implement methods, e.g. the method of flowchart 1300 of FIG. 17. Routines 1102 include a communications routines 1104 and control routines 1106. The communications routine 1104 implements the various communications protocols used by the communication device 900.

Control routines 1106 include a Tx/Rx switch control module 1105, a phase shift control module 1108, a transmitter antenna selection module 1101 and a receiver antenna selection module 1103. The Tx/Rx switch control module 1105 controls the operation of the Tx/Rx switch modules (911,921, 931). For example, based on some stored predetermined timing control information 1124, e.g., TDD timing structure information, the Tx/Rx switch control module 1105 sends a control signal or signals, e.g., signals 955, 956, to the Tx/Rx switching modules (911, 921, 931) to switch between receiver and transmitter module(s). Phase shift control module 1108 controls the phase shifter modules (901, 905) to be set to a particular phase shift value, e.g., a phase shift value that corresponds to the difference in polarization directions between the first and second antennas (902, 904). In various embodiments, the phase shifters (901, 903) are programmable, and the phase shift control module 1108 is used to program the phase shifters (901, 905). In some embodiments, the phase shift control module 1108 performs calibrations, e.g., to adjust phase shift variation due to manufacturing tolerances and/or changes such as environmental condition variation and/or component variations.

Transmitter antenna selection module 1101, included in some embodiments, allows different sets of antennas including at least one of: the first, second and third antennas (902, 904, 906) to be selected for a given transmission interval. Receiver antenna selection module 1103, included in some embodiments, allows signals obtained from different sets of antennas including at least one of: the first, second and third antennas (902, 904, 906) to be selected for a given reception interval. In some embodiments, if a particular antenna is not selected to be used a control signal sent its corresponding Tx/Rx switch which commands the switch to disconnect the antenna.

Data/information 1110 includes information such as antenna angle information 1122, e.g., information identifying polarization direction differences between the various antennas used by the phase shifters (902, 905) and/or the combiner module 2 924, timing control information 1124, e.g., a predetermined recurring TDD timing structure, stored data set 1 to be transmitted 1112, stored data set 2 to be transmitted 1114, stored received data set 1 information 1116, and stored received data set 2 information 1118. This data/information 1110 is used by the device, e.g. its processor 922 and/or various selection and control modules e.g. antenna selection module 1101, phase shift control module 1108, to control the operation of the communication device 900 and implement methods.

Figure 15:
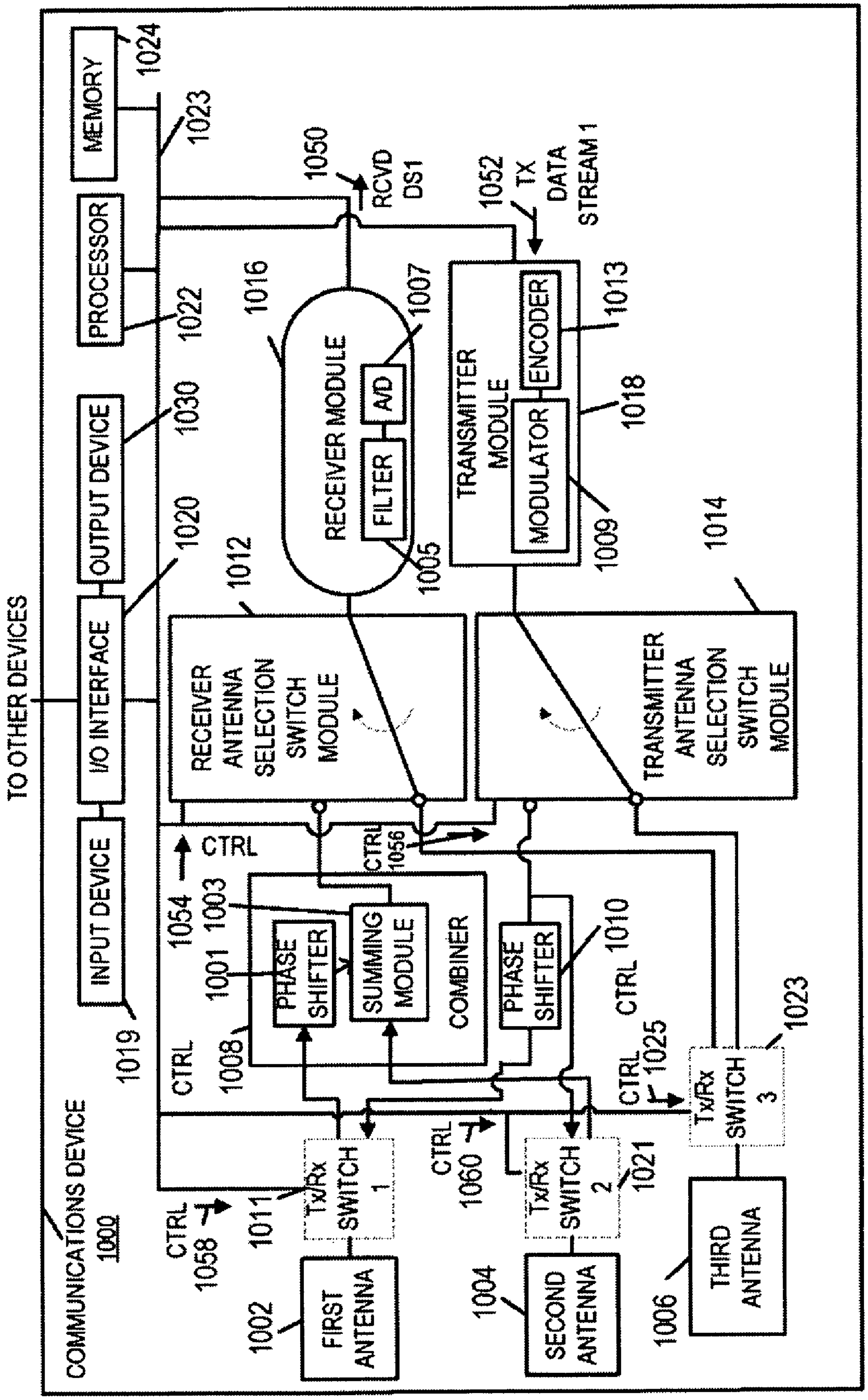
FIG. 15 illustrates another exemplary communications device implemented in accordance with yet another embodiment.

FIG. 15 shows an exemplary communication device 1000 in accordance with an exemplary embodiment. One advantage of communications device 1000 is that it is relatively simple in design and does not need to utilize a sophisticated combining module using a MMSE or maximal ratio combiner, yet can benefit from advantages of utilizing different polarization direction antennas. The exemplary communications device 1000 includes a first electrical antenna 1002, a second electrical antenna 1004, a third electrical antenna 1106 and a phase shifter 1010. The device 1000 further includes a first Tx/Rx switch 1011, a second Tx/Rx switch 1021, a third Tx/Rx switch 1023, a combiner module 1008, a receiver antenna selection switch module 1012, a transmitter antenna selection switch module 1014, a receiver module 1016, a transmitter module 1018, an I/O interface 1020, a processor 1023, and memory 1024 coupled together via a bus 1023 over which the various elements may interchange data and information. Device 1000 further includes an input device 1019, e.g., a keyboard, and an output device 1030, e.g., a display, coupled to I/O interface 1020 via which a user may interact with device 1000. In some embodiments, the I/O interface 1020 couples communications device 1000 to other network nodes and/or the Internet, e.g., via a wired connection.

As shown in FIG. 15, the first and second electrical antennas (1002 and 1004) are coupled to the (first Tx/Rx switch 1011 and second Tx/Rx switch 1021), respectively. Tx/Rx switch 1 1011 performs a switching operation, switching the first antenna 1002 between a signaling path used for reception and a signaling path used for transmission in response to control signal 1058. Tx/Rx switch 2 1021 performs a switching operation, switching the second antenna 1004 between a signaling path used for reception and a signaling path used for transmission in response to control signal 1060. In some embodiments, signals 1058 and 1060 are the same signal with the two switches (1011, 1021) being controlled in a synchronized manner. If first antenna 1002 receives a signal, and Tx/Rx switch 1 1011 is controlled to be in the receive mode, the Tx/Rx switch 1011 feeds the received signal to the combiner module 1008. If second antenna 1004 receives a signal, and Tx/Rx switch 2 1021 is controlled to be in the receive mode, the Tx/Rx switch 1021 feeds the received signal to the combiner module 1008. The combiner module 1008 includes internal components e.g. a phase shifter 1001 and a summing module 1003. The phase shifter 1001 is being used to shift the phase of the incoming signal from first antenna 1002. The phase shifter 1001 introduces a phase shift which is a function of the angle between the first and second antenna directions. After introducing the phase shift the phase shifted signal is fed to the summing module as a first input. A second input to the summing module 1003 is an output of Tx/Rx switch 2 1021, while in the Rx mode. The summing module 1003 produces a combined signal. This combined signal is then fed to the receiver antenna selection switch module 1012.

Tx/Rx switch 3 1023 performs a switching operation, switching the third antenna 1006 between a signaling path used for reception and a signaling path used for transmission in response to control signal 1025. The third antenna 1006, is also coupled, via Tx/Rx switch 3 1025 when set to the receive mode, to the receiver antenna selection switch module 1012. The receive antenna selection module 1012 selects between the combiner module 1008 output signal and the third antenna 1006 receive output signal. This selection is based on the control signal 1054 being communicated to the receiver antenna selection switch module 1012. Thus when device 1000 is being controlled to receive signals, the receive antenna selection switch module 1012 will couple either the output from the combiner 1008 or the output of Tx/Rx switch 1023, to the input of receiver module 1016. The receiver module 1016 includes internal components e.g. a filter 1005 which filter out noise and unwanted signals received along with the message signal and an A/D converter 1007 which converts analog data into digital, for further data processing in the digital domain. A digital output in the form of received data stream DS1 1050 is obtained from the receiver module 1016.

Exemplary transmission from device 1000 will now be described. Transmitter module 1018 includes an encoder 1013, and a modulator 1009. The transmitter module 1018 processes the transmit data stream 1 1052 by encoding and modulating the incoming data stream, e.g., received information bits are processed into coded bits by encoder 1013, e.g., an LDPC encoder, and the encoded bits are mapped into generated modulation symbols by modulator 1009. The output signal from transmitter module 1018 is fed as input to the transmitter antenna selection switch module 1014. In the event that the communications device 1000 is being controlled to transmit using the second antenna 1004, an encoded and modulated signal from the transmitter module 1018 is fed to the second antenna via Tx/Rx switch 2 1021. Phase shifter 1010 phase shifts an output signal from transmitter antenna selection switch module 1014 and provides the phase shifted output to an input of Tx/Rx switch 1 1011. In the event that the communications device 1000 is being controlled to transmit using the first antenna 1002, a phase shifted encoded and modulated signal derived from the transmitter module 1018 is fed to the first antenna 1002 via Tx/Rx switch 1 1011. In various embodiments, when the device 1000 is being controlled to transmit using the first antenna 1002 the device is also controlled to transmit concurrently using the second antenna 1004.

Based on the control signal 1056, the selection switch 1014 may alternatively feed a signal to be transmitted to the third antenna 1006 or first and the second antenna's (1002 and 1004). If the transmitter antenna selection switch module 1014 selects to feed the signal to the third antenna 1006, it may do so without introducing any phase shift in the signal. In the other case the selection switch 1014 may feed the signal to a phase shifter 1010 which is coupled to the first Tx/Rx switch 1011, and to the second Tx/Rx switch 1021 which is coupled to the second antenna 1004. The signal is effectively being phase shifted before it is fed to the Tx/Rx switch 1011 and from here it is fed to the first antenna from where it can be transmitted. The non phase shifted signal is fed from the second Tx/Rx switch 1021 to the second antenna 1004, from where it can be transmitted.

Figure 16:
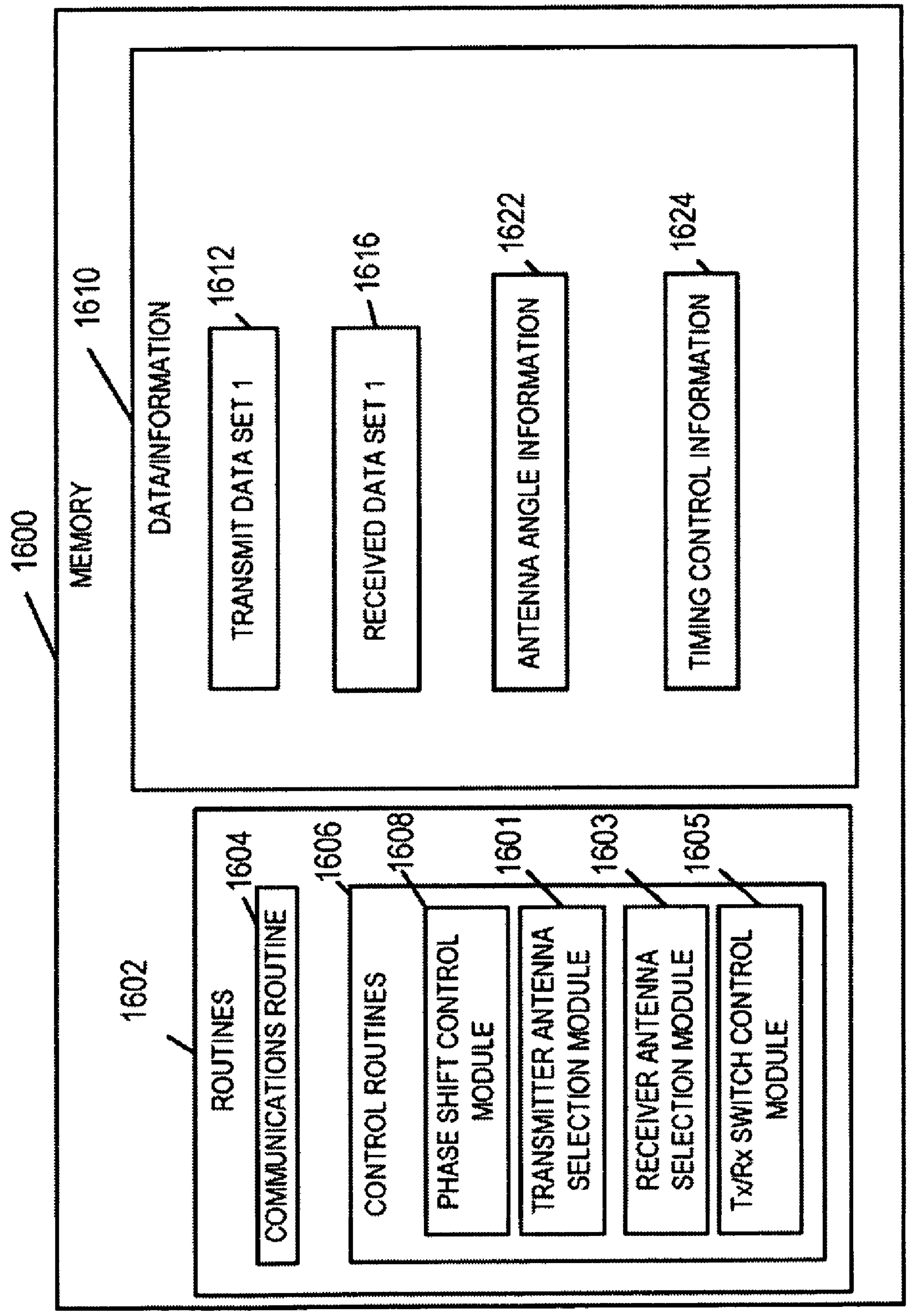
FIG. 16 illustrates an exemplary memory which may be used in the communication devices shown in FIG. 15.

Memory 1024 is, e.g., exemplary memory 1600 of FIG. 16. Memory 1600 includes routines 1602 and data/information 1610. The processor 1022, e.g., a CPU, executes the routines 1602 and uses the data/information 1610 in memory 1600 to control the operation of the communications device 1000 and implement methods. Routines 1602 include a communications routines 1604 and control routines 1606. The communications routine 1604 implements the various communications protocols used by the communication device 1000.

Control routines 1606 include a Tx/Rx switch control module 1605, a phase shift control module 1608, a transmitter antenna selection module 1601 and a receiver antenna selection module 1603. The Tx/Rx switch control module 1605 controls the operation of the Tx/Rx switch modules (1011, 1021, 1023). For example, based on some stored predetermined timing control information 1624, e.g., TDD timing structure information, the Rx/Tx switch control module 1605 sends a control signal or signals, e.g., signals (1058, 1060, 1025) to the Tx/Rx switching modules (1011, 1021, 1023), respectively, to switch between receiver and transmitter module(s). Phase shift control module 1608 controls the phase shifter modules (1001, 1010) to be set to a particular phase shift value, e.g., a phase shift value that corresponds to the difference in polarization directions between the first and second antennas (1002, 1004). In various embodiments, the phase shifters (1001, 1010) are programmable, and the phase shift control module 1608 is used to program the phase shifters (1001, 1005). In some embodiments, the phase shift control module 1608 performs calibrations, e.g., to adjust phase shift variation due to manufacturing tolerances and/or changes such as environmental condition variation and/or component variations.

Transmitter antenna selection module 1601 controls the transmitter antenna selection switch module 1014 to select between (i) using the first and second antennas (1002, 1004) for transmission and using (ii) the third antenna 1006 for transmission. Receiver antenna selection module 1603 controls the receiver antenna selection switch module 1012 to select between (i) using the first and second antennas (1002, 1004) for reception and using (ii) the third antenna 1006 for reception. In some embodiments, if a particular antenna is not selected to be used for either transmission or reception, a control signal sent its corresponding Tx/Rx switch commanding the switch to disconnect the antenna.

Data/information 1610 includes information such as antenna angle information 1622, e.g., information identifying polarization direction differences between the various antennas which is used by the phase shifters (1001, 1001), timing control information 1624, e.g., a predetermined recurring TDD timing structure information, stored data set 1 to be transmitted 1612, and stored received data set 1 information 1616. This data/information 1610 is used by the device 1000, e.g. its processor 1022 and/or various selection and control modules e.g. phase shift control module 1608 and Tx/Rx switch control module 1605, to control the operation of the communication device 1000 and implement methods.

In various embodiments, the first electrical antenna 1002 has a polarization in a first direction and the second electrical antenna 1004 has a polarization in a second direction, and the first and second directions are different. In some such embodiments, the third electrical antenna has a polarization in a third direction, and the first, second and third polarization directions are each different from one another by more than 45 degrees. In some embodiments, the angle between the first and second directions is in the range of 80 to 100 degrees.

In some embodiments, the phase shifter 1001 and/or the phase shifter 1010 introduce a phase shift by a predetermined amount, the predetermined amount being a function of the angle between the first and second polarization directions associated with the first and second antennas (1002, 1004). In some such embodiments, the angle between the first and second directions is 90 degrees and the phase shift is 90 degrees.

Figure 17:
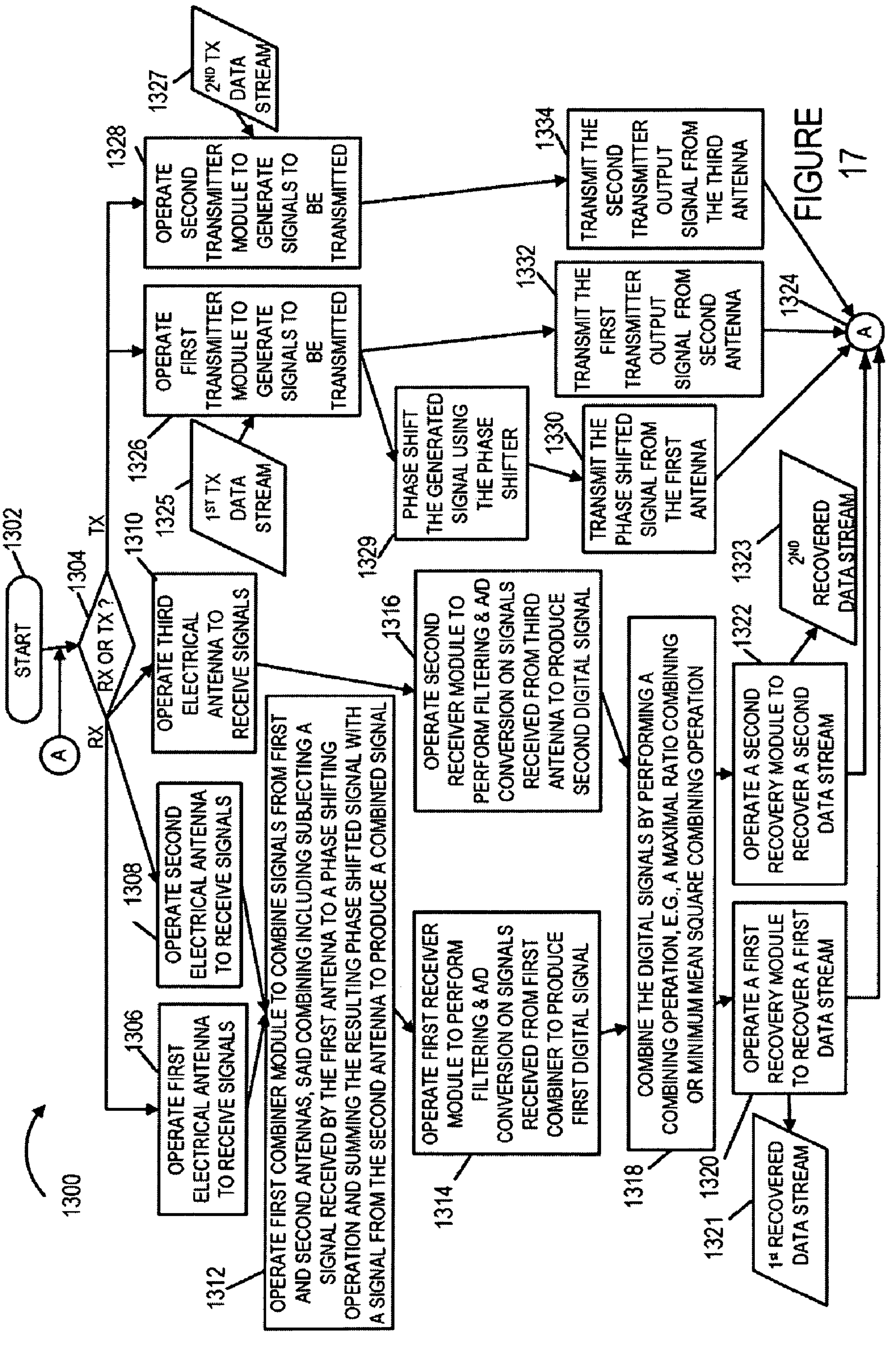
FIG. 17 is a flowchart of an exemplary method of operating a communications device in accordance with an exemplary embodiment.

FIG. 17 is a flowchart 1300 of an exemplary method of operating a communications device, e.g. a communications device 900 of FIG. 13, using a plurality of electrical antennas with different polarization directions in accordance with various embodiments. The exemplary method starts in step 1302, where the communications device is powered on and initialization is performed. Operation proceeds from start step 1302 to step 1304. In step 1304, the communications device proceeds as a function of whether it is to be operated in a receive mode or transmit mode, e.g., in accordance with a predetermined timing structure, e.g., a TDD timing structure. If the device determines that it is to be operated in a receive mode, Tx/Rx switches, e.g., switches (911, 921, 931) of device 900, are controlled to be set to the receive mode, and operation proceeds from step 1304 to steps 1306, 1308 and 1310, which are performed concurrently. However, if the device determines that it is to be operated in a transmit mode, Tx/Rx switches are controlled to be set to the transmit mode and operation proceeds from step 1304 to steps 1326 and 1328, which can be performed in parallel.

In step 1306, the communications device is operated to receive signals using the first electrical antenna, e.g. electric antenna 1 902 of FIG. 13, which has a polarization in a first direction. In step 1308, the communications device is operated to receive signals using a second electrical antenna, e.g. electric antenna 2 904 of FIG. 13, which has a polarization in a second direction which is different from the first direction. In step 1310, the communications device is operated to receive signals using a third electrical antenna, e.g. electric antenna 3 906 of FIG. 13, which has a polarization in a third direction, and the third direction is different from both the first and second directions. In some embodiments, the first second and third antenna polarization directions are different from each other by more than 45 degrees. In some such embodiments, the angle between the first and second polarization directions associated with the first and second antennas, respectively is in the range of 80 to 100 degrees.

Operation proceeds from step 1306 and 1308 to step 1312. In step 1312 the communications device operates a first combiner module, e.g., module 903 of FIG. 13, to combine signals from the first and second antennas, said combining including subjecting a signal received by the first antenna to a phase shifting operation and summing the resulting phase shifted signal with a signal received from the second antenna to produce a combined signal. In various embodiments, the phase shifting introduces a phase shift of a predetermined amount, and the predetermined amount is a function of the angle between the first and second antennas. In some embodiments, the angle between the first and second polarization directions, associated with first and second antennas, is 90 degrees and the phase shift is 90 degrees. Operation proceeds from step 1312 to step 1314.

In step 1314, a first receiver module, e.g., receiver module 1 908 of FIG. 13, is operated to perform filtering and analog to digital conversion on signals received from the first combiner to produce a first digital signal.

Returning to step 1316, in step 1316, a second receiver module, e.g., receiver module 2 912 of FIG. 13, is operated to perform filtering and analog to digital conversions on signals received from the third antenna to produce a second digital signal. Operation proceeds from steps 1314 and 1316 to step 1318. In step 1318, a second combiner module, e.g., combiner module 924 of FIG. 13 combines the digital signals by performing a combining operation, e.g., a maximal ratio combining operation or a minimum mean square combining operation. Operation proceeds from step 1318 to steps 1320 and 1322 which are performed in parallel. In step 1320, a first recovery module, e.g., symbol recovery module 916 of FIG. 13, is operated to recover a first data stream 1321. The first recovery module uses as input, output signals from the second combiner module. In step 1322, a second recovery module, e.g., symbol recovery module 918 of FIG. 13, is operated to recover second data stream 1323. The second recovery module uses as input, output from the second combiner module. Operation proceeds from steps 1320 and 1322 to connecting node A 1324.

Returning to step 1326, in step 1326 a first transmitter module, e.g., transmitter module 1 910 of FIG. 13 is operated to generate signals to be transmitted from first transmit data stream 1325. Operation proceeds from step 1326 to step 1329 and step 1332. In step 1329, a phase shifter module, e.g., phase shifter 905 of FIG. 13, phase shifts the generated signal from the first transmitter module. Operation proceeds from step 1329 to step 1330.

Returning to step 1328, in step 1328 a second transmitter module, e.g., transmitter module 2 914 of FIG. 13 is operated to generate signals to be transmitted from $2^{nd}$ transmit data stream 1327. Operation proceeds from step 1328 to step 1334.

Step 1330, step 1332 and step 1334 are performed in parallel. In step 1330 the communications device transmits the phase shifted signal, which is a processed signal from the first transmitter module, via the first antenna. In step 1332 the communications device transmits the output signal from the first transmitter module via the second antenna. In step 1334, the communications device transmits the generated signal from the second transmitter module via the third antenna. Operation proceeds from steps 1330, 1332 and 1334 to connecting node A 1324.

Operation proceeds from connecting node A 1324 to step 1304 where another decision is made as to whether to be in receive mode or transmit mode. In various embodiments, the mode alternates between receive and transmit in accordance with a predetermined TDD timing structure.

Figures 18, 18A:
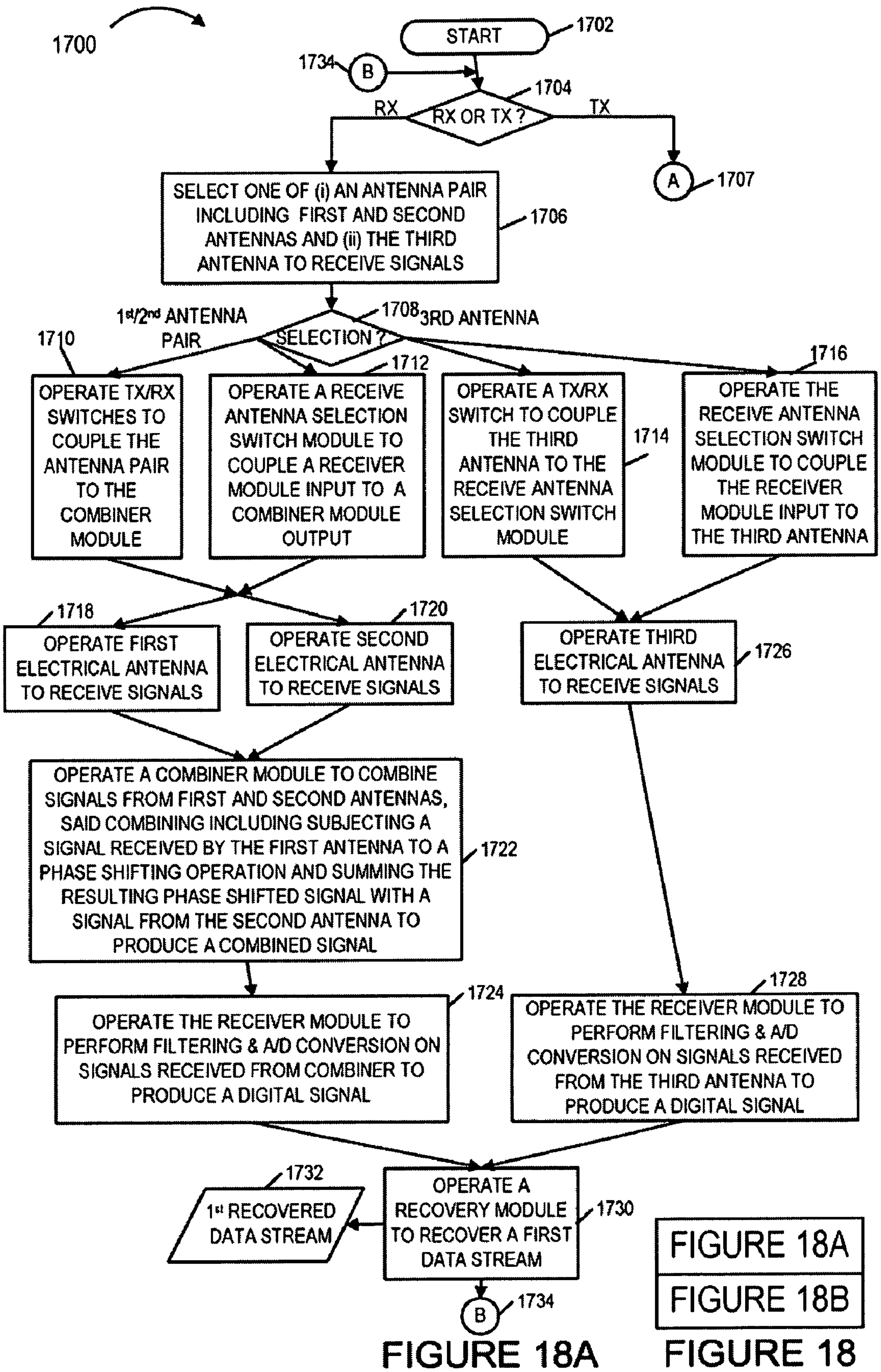
FIG. 18, comprising the combination of FIG. 18A and FIG. 18B, is a flowchart of an exemplary method of operating a communications device in accordance with another exemplary embodiment.
Figure 18B:
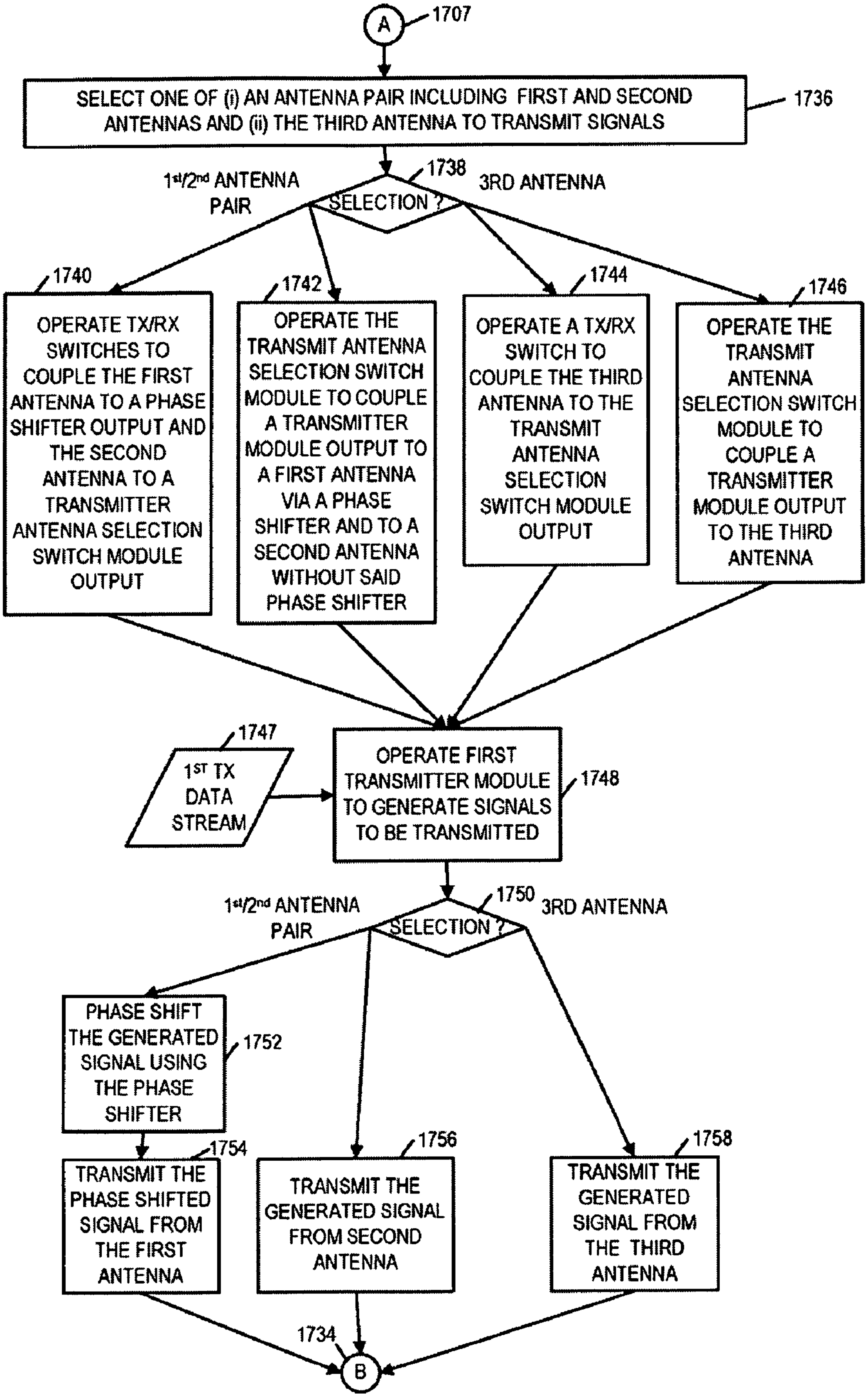

FIG. 18 comprising the combination of FIG. 18A and FIG. 18B is a flowchart 1700 of an exemplar method of operating a communications device, e.g., a wireless terminal such as a mobile node, including a plurality of electrical antennas having different polarization directions, in accordance with various embodiments. For example, the communications device includes first, second and third electrical antenna, each having a different polarization direction. In some such embodiments, the first antenna has a first polarization direction, the second antenna has a second polarization direction and the third antenna has a third polarization direction, and the first second and third polarization directions are different from one another by more than 45 degrees. In some embodiments, the angle between the first and second directions is in the range of 80 to 100 degrees. The communications device is. e.g., communications device 1000 of FIG. 15. Operation starts in step 1702, where the communications device is powered on and initialized and proceeds to step 1704.

In step 1704 the communications device determines whether it is to be in a receive mode or transmit mode, e.g., in accordance with current timing information and a predetermined TDD timing structure. If it is determined that the communications device is to be in a receive mode, then operation proceeds from step 1704 to step 1706; however, if it is determined that the communications device is to be in transmit mode, then operation proceeds from step 1704 via connecting node A 1707 to step 1736.

Returning to step 1706, in step 1706, the communications device selects one of: (i) an antenna pair including first and second antennas and (ii) a third antenna to receive signals. Operation proceeds from step 1706 to step 1708.

In step 1708, the communications device is controlled to proceed to different steps based on the selection of step 1706. If the selection is to receive using the antenna pair including first and second antennas, then operation proceeds from step 1708 to steps 1710 and 1712 which may be performed in parallel. Alternatively, if the selection is to receive using the third antenna, then operation proceeds from step 1708 to steps 1714 and 1716.

In step 1710, the communications device operates Tx/Rx switches, to couple the antenna pair to a combiner module, e.g., switches (1011, 1021) are operated to couple antennas (1002, 1004) to combiner module 1008 of FIG. 10. In step 1712, the communications device operates a receive antenna selection switch module. e.g., module 1012 of FIG. 10, to couple a receiver module, e.g., module 1016 of FIG. 15, to the combiner module. Operation proceeds from steps 1710 and 1712 to steps 1718 and 1720 which are performed in parallel.

In step 1718 the communications device operates the first electrical antenna, e.g., antenna 1002 of FIG. 15 to receive signals, while in step 1720 the communications device operates the second electrical antenna, e.g., antenna 1004 of FIG. 10 to receive signals. Operation proceeds from steps 1718 and 1720 to step 1722. In step 1722 the communications device operates a combiner module to combine signals from the first and second antennas, said combining including subjecting a signal received by the first antenna to a phase shifting operation and summing the resulting phase shifted signal with a signal from the second antenna to produce a combined signal. In various embodiments, the phase shifting introduces a phase shift of a predetermined amount, the predetermined amount being a function of the angle between the first and second polarization directions associated with the first and second antenna, respectively. In some such embodiments, the angle between the first and second antenna directions is 90 degrees and the phase shift is 90 degrees. Operation proceeds from step 1722 to step 1724. In step 1724, the communication device operates the receiver module to perform filtering and an analog to digital conversion on the signals received from the combiner to produce a digital signal. Operation proceeds from step 1724 to step 1730.

Returning to step 1708, if in step 1708 it is determined that the selection of step 1706 is to use the third antenna to receive signals, then operation proceeds from step 1708 to steps 1714 and 1716, which may be performed in parallel. In step 1714, the communications device operates a Tx/Rx switch to couple the third antenna to receive antenna selection switch module, e.g., switch 1023 is operated to couple third antenna 1006 to receiver antenna selection switch module 1012 of FIG. 15. In step 1716, the communications device operates the receive antenna selection switch module to couple the receiver module input to the third antenna. Operation proceeds from steps 1714 and 1716 to step 1726.

In step 1726, the communications device operates the third electrical antenna, e.g., third antenna 1006 of FIG. 15, to receive signals. Operation proceeds from step 1726 to step 1728. In step 1728 the communications device operates the receiver module to perform filtering and an analog to digital conversion on signals received from the third antenna to produce a digital signal. Operation proceeds from step 1728 to step 1730.

In step 1730 the communications device operates a recovery module to recover a first data stream 1732. In some embodiments, the recovery module is included as part of the receiver module while in other embodiments, the recovery module is a separate unit. Operation proceeds from step 1730 via connecting node B 1734 to step 1704, e.g., for another iteration.

Returning to step 1736, in step 1736 the communications device selects one of: (i) an antenna pair including first and second antennas and (ii) the third antenna to transmit signals. The selection may be based on signal quality measurements and/or a received antenna selection control signal. Operation proceeds from step 1736 to step 1738.

In step 1738, the communications device is controlled to proceed to different steps based on the selection of step 1736.

If the selection is to transmit using the antenna pair including first and second antennas, then operation proceeds from step 1738 to steps 1740 and 1742 which may be performed in parallel. Alternatively, if the selection is to transmit using the third antenna, then operation proceeds from step 1738 to steps 1744 and 1746 which may be performed in parallel.

In step 1740, the communications device operates Tx/Rx switches, to couple the first antenna to a phase shifter output and the second antenna to a transmitter antenna selection switch output, e.g., switch 1011 couples first antenna 1002 to phase shifter 1010 output, and switch 1021 couples second antenna 1004 to transmitter antenna selection switch module 1014 of FIG. 15. In step 1742, the communications device operates the transmit antenna selection switch module, to couple a transmitter module, e.g., module 1018 of FIG. 15, output to the first antenna via the phase shifter and to a second antenna without traversing the phase shifter. Operation proceeds from steps 1740 and 1742 to step 1748.

Returning to steps 1744 and 1746, in step 1744, the communications device operates a Tx/Rx switch, e.g., switch 1023, to couple the third antenna, e.g., antenna 1006, to the transmit antenna selection switch module 1014 output. In step 1746, the communications device operates the transmit antenna selection switch module to couple a transmitter module output to the third antenna. Operation proceeds from steps 1744 and 1746 to step 1748.

In step 1748, the communications device operates the transmitter module to generate signals to be transmitted using the first transmit data stream 1747 as input. Operation proceeds from step 1748 to step 1750. Step 1750 indicates that the generated signals are routed differently depending upon the selection of step 1736, since difference selections resulted in different switch settings. If the $1^{st}/2^{nd}$ antenna pair was selected in step 1736 to be used for the transmission, then operation proceeds from step 1750 to step 1752 and step 1756; however, if the $3^{rd}$ antenna was selected in step 1736 to be used for transmission, then operation proceeds from step 1750 to step 1758.

Returning to step 1752, in step 1752 a phase shifter, e.g., phase shifter 1010, phase shifts the generated signal. In some embodiments, the step of subjecting the signal to be transmitted to a phase shifting operation includes phase shifting the signal to be transmitted by a predetermined fixed amount which is a function of the angle between the first and second electrical antenna polarization directions. Operation proceeds from step 1752 to step 1754 in which the communications device transmits the phase shifted signal from the first antenna. In step 1756, which is performed in parallel to step 1754, the communications device transmits the generated signal from the second antenna. In some other embodiments, the communications device transmits the phase shifted signal from the second antenna, and transmits the generated signal from the first antenna.

Alternatively, if the selection is to use the third antenna, in step 1758 the communications device transmits the generated signal from the third antenna. Operation proceeds from steps 1754 and 1756 or step 1758, via connecting node B 1734 to step 1704, where another receive/transmit mode determination is performed.

Figure 19:
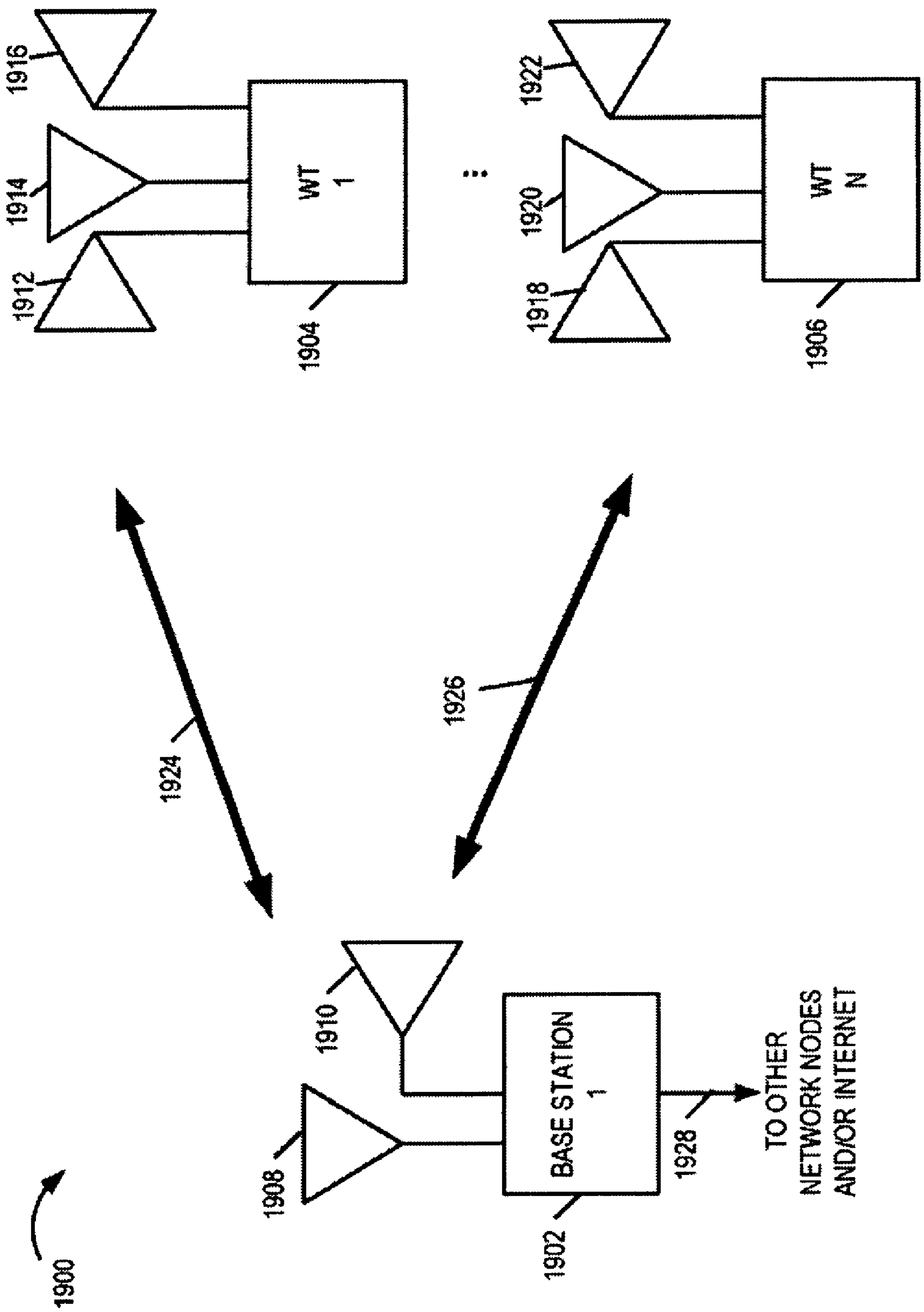
FIG. 19 is a drawing of an exemplary communications system in accordance with various exemplary embodiments.

FIG. 19 is a drawing of an exemplary communications system 1900 in accordance with various embodiments. Exemplary communications system 1900 includes a base station 1902 and a plurality of wireless terminals (WT 1 1904, . . . , WT N 1906). Base station 1 1902 includes antennas with different polarization directions (antenna 1908, antenna 1910). WT 1 1904 includes multiple electrical antennas with different polarization directions (antenna 1912, antenna 1914, antenna 1916). Similarly, WT N 1906 includes multiple electrical antennas with different polarization directions (antenna 1918, antenna 1920, antenna 1922). WT 1 1904 is coupled to BS 1 1902 via wireless link 1924. WT N 1906 is coupled to BS 1 1902 via wireless link 1926. BS 1 1902 is coupled to other network nodes, e.g., other base stations, routers, AAA nodes, home agent nodes, etc., via network link 1928.

The exemplary wireless terminals (1904, 1906) are, e.g., wireless terminals in accordance with the implementation of one or more of: WT 900 or FIG. 13, WT 1000 of FIG. 15, the method of flowchart 1300 of FIG. 17 and the method of flowchart 1700 of FIG. 18.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

The invention claimed is:

1. A communications device, comprising:

a first electrical antenna, the first electrical antenna having a polarization in a first direction;

a second electrical antenna, the second electrical antenna element having a polarization in a second direction; and a first combining module for combining signals from said first and second antennas, said combining module including a phase shifter for shifting the signal from one of said first and second antennas by a predetermined amount which is a function of said first and second directions, prior to combining them using a summing module to produce a combined signal.

2. The communications device of claim 1 further comprising:

a third electrical antenna, the third electrical antenna having a polarization in a third direction, said first, second and third directions each being different from one another by more than 45 degrees.

3. The communications device of claim 2, wherein said angle between the first and second directions is in the range of 80 to 100 degrees.

4. The communications device of claim 1, further comprising:

a third electrical antenna, the third electrical antenna having a polarization in a third direction, said first, second and third directions each being different from one another by more than 45 degrees;

wherein said angle between the first and second directions is in the range of 80 to 100 degrees; and wherein said predetermined amount is a function of the angle between said first and second directions.

5. The communications device of claim 4, wherein said angle between the first and second directions is 90 degrees and the phase shift is 90 degrees.

6. The communications device of claim 1, further comprising:

a third electrical antenna, the third electrical antenna having a polarization in a third direction, said first, second and third directions each being different from one another by more than 45 degrees;

a first receiver module coupled to the output of said first combining module; and a second receiver module coupled to output of the third antenna.

7. The communications device of claim 6, further comprising:

a second combiner module coupled to the first and second receiver modules for combining signals generated by said first and second receiver modules from the combined output of said first and second antennas and the output of the third antenna, respectively.

8. The communications device of claim 7, wherein the second combiner is one of a maximal ratio combiner and minimum mean square combiner.

9. The communications device of claim 8, further comprising:

a second phase shifter and a first transmitter module, an output of the first transmitter module being coupled to the second antenna, said output also being coupled to said first antenna by way of said second phase shifter.

10. The communications device of claim 9, further comprising:

a second transmitter module coupled to said third antenna.

11. A method of operating a communications device, comprising:

receiving a first signal via a first electrical antenna, the first electrical antenna having a polarization in a first direction;

receiving a second signal via a second electrical antenna, the second electrical antenna having a polarization in a second direction; and combining the first and the second signals from said first and second antennas, said combining including introducing a phase shift to the first signal by a predetermined amount which is a function of said first and second directions, and summing the resulting phase shifted signal with the second signal from the second antenna to produce a combined signal.

12. The method of claim 11, further comprising:

receiving a third signal via a third electrical antenna, the third electrical antenna having a polarization in a third direction, said first, second and third directions each being different from one another by more than 45 degrees.

13. The method of claim 12, wherein said angle between the first and second antennas is in the range of 80 to 100 degrees.

14. The method of claim 11, further comprising:

receiving a third signal via a third electrical antenna, the third electrical antenna having a polarization in a third direction, said first, second and third directions each being different from one another by more than 45 degrees;

wherein said angle between the first and second antennas is in the range of 80 to 100 degrees; and wherein said predetermined amount is a function of the angle between said first and second directions.

15. The method of claim 14, wherein said angle between the first and second directions is 90 degrees and the phase shift is 90 degrees.

16. The method of claim 11, further comprising:

receiving a third signal via a third electrical antenna, the third electrical antenna having a polarization in a third direction, said first, second and third directions each being different from one another by more than 45 degrees;

performing, using a first receiver module coupled to said first combining module, a filtering and analog to digital conversion operation on the combined signal.

17. The method of claim 16, further comprising:

performing, using a second receiver module coupled to the third antenna, a filtering and analog to digital conversion operation on a signal output by said third antenna to produce a second digital signal; and combining the combined signal and the second digital signal by performing one of i) a maximal ratio combining operation and ii) minimum mean square combining operation.

18. The communications method of claim 17, further comprising:

generating, using a first transmitter module, a signal to be transmitted;

transmitting the signal to be transmitted from the second electrical antenna;

subjecting the signal to be transmitted to a phase shifting operation; and transmitting the phase shifted version of the signal to be transmitted from the first antenna.

19. The method of claim 18, wherein the step of subjecting the signal to be transmitted to a phase shifting operation includes phase shifting the signal to be transmitted by a predetermined fixed amount which is a function of the angle between the first and second electrical antennas.

20. The communications method of claim 17, further comprising:

generating, using a first transmitter module, a signal to be transmitted;

transmitting the signal to be transmitted from the first electrical antenna;

subjecting the signal to be transmitted to a phase shifting operation; and transmitting the phase shifted version of the signal to be transmitted from the second antenna.

21. A communications device, comprising:

first electrical antenna means, the first electrical antenna means having a polarization in a first direction;

second electrical antenna means, the second electrical antenna means having a polarization in a second direction; and first combining means for combining signals from said first and second antenna means, said combining means including phase shifter means for shifting the signal from one of said first and second antenna means by a predetermined amount which is a function of said first and second directions, prior to combing them using summing means to produce a combined signal.

22. The communications device of claim 21, further comprising:

third electrical antenna means, the third electrical antenna means having a polarization in a third direction, said first, second and third directions each being different from one another by more than 45 degrees.

23. The communications device of claim 22, wherein said angle between the first and second directions is in the range of 80 to 100 degrees.

24. The communications device of claim 21, further comprising:

third electrical antenna means, the third electrical antenna means having a polarization in a third direction, said first, second and third directions each being different from one another by more than 45 degrees;

wherein said angle between the first and second directions is in the range of 80 to 100 degrees; and wherein said predetermined amount is a function of the angle between said first and second directions.

25. A non-transitory computer readable medium embodying machine executable instructions for controlling a communications device to implement a method, the method comprising:

receiving a first signal via a first electrical antenna, the first electrical antenna having a polarization in a first direction;

receiving a second signal via a second electrical antenna, the second electrical antenna having a polarization in a second direction; and combining, using a first combining module, the first and the second signals from said first and second antennas, said combining including subjecting a signal received by the first antenna to a phase shifting operation to introduce a phase shift by a predetermined amount which is a function of said first and second directions, and summing the resulting phase shifted signal with a signal from the second antenna to produce a combined signal.

26. The non-transitory computer readable medium of claim 25, wherein the method further comprises:

operating a third electrical antenna to receive signals, the third electrical antenna having a polarization in a third direction, said first second and third directions each being different from one another by more than 45 degrees.

27. The non-transitory computer readable medium of claim 26, wherein said angle between the first and second antennas is in the range of 80 to 100 degrees.

28. The non-transitory computer readable medium of claim 25, wherein the method further comprises:

receiving a third signal via a third electrical antenna, the third electrical antenna having a polarization in a third direction, said first second and third directions each being different from one another by more than 45 degrees;

wherein said angle between the first and second antennas is in the range of 80 to 100 degrees; and wherein said predetermined amount is a function of the angle between said first and second directions.

29. An apparatus comprising:

a processor for controlling a communications device to:

operate a first electrical antenna, the first electrical antenna having a polarization in a first direction to receive signals;

operate a second electrical antenna, the second electrical antenna element having a polarization in a second direction to receive signals; and operate a first combining module to combine signals from said first and second antennas, said combining including subjecting a signal received by the first antenna to a phase shifting operation to introduce a phase shift by a predetermined amount which is a function of said first and second directions, and summing the resulting phase shifted signal with a signal from the second antenna to produce a combined signal.

30. The apparatus of claim 29, wherein said processor is further configured to control said communications device to:

operate a third electrical antenna to receive signals, the third electrical antenna having a polarization in a third direction, said first second and third directions each being different from one another by more than 45 degrees.

31. The apparatus of claim 30, wherein said angle between the first and second antennas is in the range of 80 to 100 degrees.

32. The apparatus of claim 29, wherein said processor is further configured to control said communications device to:

operate a third electrical antenna to receive signals, the third electrical antenna having a polarization in a third direction, said first second and third directions each being different from one another by more than 45 degrees;

wherein said angle between the first and second antennas is in the range of 80 to 100 degrees wherein said predetermined amount is a function of the angle between said first and second directions.

* * * * *